US009608838B2

(12) United States Patent
Cooke

(10) Patent No.: US 9,608,838 B2
(45) Date of Patent: Mar. 28, 2017

(54) BONDED INTERCONNECTION OF LOCAL NETWORKS

(75) Inventor: Stephen P. Cooke, Rocky View (CA)

(73) Assignee: GENESIS TECHNICAL SYSTEMS CORP., Calgary (CA)

( * ) Notice: Subject to any disclaimer, the term of this patent is extended or adjusted under 35 U.S.C. 154(b) by 982 days.

(21) Appl. No.: 12/997,193

(22) PCT Filed: Jun. 9, 2008

(86) PCT No.: PCT/CA2008/001079
§ 371 (c)(1),
(2), (4) Date: Dec. 9, 2010

(87) PCT Pub. No.: WO2009/149533
PCT Pub. Date: Dec. 17, 2009

(65) Prior Publication Data
US 2011/0090892 A1    Apr. 21, 2011

(51) Int. Cl.
*H04L 12/28* (2006.01)
*H04L 12/42* (2006.01)
*H04M 11/06* (2006.01)

(52) U.S. Cl.
CPC .......... *H04L 12/2865* (2013.01); *H04L 12/42* (2013.01); *H04M 11/062* (2013.01)

(58) Field of Classification Search
CPC .......... H04Q 2213/13389; H04Q 2213/13209; H04Q 2213/13039; H04Q 2213/13384;
(Continued)

(56) References Cited

U.S. PATENT DOCUMENTS 5,550,836 A * 8/1996 Albrecht ................. H04L 5/143
370/447
5,844,596 A * 12/1998 Goodman .............. H04H 20/81
348/14.02
(Continued)

FOREIGN PATENT DOCUMENTS

JP       2007513556        5/2007
RU      2310903 C2        11/2007
WO  WO 2008/045525 A2    4/2008

OTHER PUBLICATIONS

Decision on Grant for Russian Patent Application No. 2010152368/0767529), Nov. 7, 2012, 13 pages.
(Continued)

*Primary Examiner* — Dung B Huynh
(74) *Attorney, Agent, or Firm* — Wolf, Greenfield & Sacks, P.C.

(57) ABSTRACT

Apparatus and methods relating to bonded interconnection of local communication networks are disclosed. Bonded communication links, including multiple constituent links that have been bonded together, are terminated to enable communications over the bonded links using bandwidth available on the constituent links. A cross-connect function determines whether received communication traffic is to be forwarded to one or more of a local communication network and the terminated bonded links. The received communication traffic is forwarded in accordance with the determination. The local communication networks may include ring networks, linear networks, or both. The bonded links and links between nodes in a local communication network are bonded DSL (Digital Subscriber Line) links in some embodiments. Bonding of DSL links in this manner can be used, for instance, to extend the reach of DSL service without sacrificing bandwidth.

44 Claims, 8 Drawing Sheets

(58) Field of Classification Search
CPC ........... H04Q 11/0478; H04Q 11/0067; H04Q 11/0071; H04L 12/44; H04L 12/46; H04L 12/2865; H04L 12/42; H04L 2012/5605; H04L 2012/561; H04L 65/4038; H04L 65/4076; H04L 12/2874; H04L 12/2898; H04L 12/6418; H04L 2012/6478; H04L 25/0272; H04L 45/245; H01B 7/0876; H01B 11/04; H01B 13/0235; H01B 13/04; H04M 11/062; H04M 3/2209; H04M 3/30; H04M 3/304; H04M 3/34
See application file for complete search history.

(56) References Cited

U.S. PATENT DOCUMENTS

| | | | |
|---|---|---|---|
| 5,912,879 A * | 6/1999 | Cha | H04L 12/5602 370/229 |
| 5,953,318 A * | 9/1999 | Nattkemper et al. | 370/236 |
| 6,252,853 B1 | 6/2001 | Ohno | 370/242 |
| 6,292,539 B1 * | 9/2001 | Eichen | G06Q 10/06 379/1.04 |
| 6,424,657 B1 * | 7/2002 | Voit et al. | 370/412 |
| 6,507,608 B1 * | 1/2003 | Norrell | 375/219 |
| 6,542,585 B2 | 4/2003 | Goodman | 379/93.01 |
| 6,853,647 B1 * | 2/2005 | Rawson et al. | 370/463 |
| 6,865,155 B1 * | 3/2005 | Wong et al. | 370/235 |
| 6,879,590 B2 | 4/2005 | Pedersen et al. | |
| 6,934,760 B1 | 8/2005 | Westbrook et al. | |
| 6,967,952 B1 * | 11/2005 | Akers et al. | 370/395.1 |
| 6,983,042 B1 * | 1/2006 | Chapman et al. | 379/201.02 |
| 6,998,964 B2 * | 2/2006 | Lomax et al. | 370/463 |
| 7,006,500 B1 * | 2/2006 | Pedersen et al. | 370/394 |
| 7,016,348 B2 * | 3/2006 | Laursen et al. | 370/389 |
| 7,035,323 B1 | 4/2006 | Arato et al. | |
| 7,058,072 B1 * | 6/2006 | Ikeda | 370/422 |
| 7,171,121 B1 * | 1/2007 | Skarica et al. | 398/67 |
| 7,240,361 B2 * | 7/2007 | Casey et al. | 726/2 |
| 7,277,450 B2 * | 10/2007 | Neeley et al. | 370/420 |
| 7,443,864 B1 * | 10/2008 | Johnson | 370/400 |
| 7,639,596 B2 * | 12/2009 | Cioffi | 370/201 |
| 7,768,938 B2 * | 8/2010 | DeMartino | 370/252 |
| 8,701,152 B2 | 4/2014 | Chen et al. | |
| 8,711,836 B2 | 4/2014 | Cooke et al. | |
| 2002/0072331 A1 * | 6/2002 | Fischer et al. | 455/63 |
| 2002/0089973 A1 * | 7/2002 | Manor | 370/352 |
| 2002/0131431 A1 * | 9/2002 | Wank et al. | 370/403 |
| 2002/0176411 A1 * | 11/2002 | Nattkemper et al. | 370/386 |
| 2003/0012180 A1 * | 1/2003 | Donahue et al. | 370/352 |
| 2003/0012485 A1 * | 1/2003 | Neeley et al. | 385/16 |
| 2003/0022658 A1 * | 1/2003 | Chapman et al. | 455/414 |
| 2003/0060210 A1 | 3/2003 | Ravishankar et al. | |
| 2003/0086514 A1 * | 5/2003 | Ginis et al. | 375/346 |
| 2003/0156691 A1 * | 8/2003 | Rahamim | 379/93.28 |
| 2003/0165235 A1 | 9/2003 | Aghdam et al. | |
| 2003/0187985 A1 * | 10/2003 | Rohling et al. | 709/225 |
| 2003/0223482 A1 * | 12/2003 | Oksman et al. | 375/222 |
| 2003/0227373 A1 * | 12/2003 | Lou et al. | 340/310.01 |
| 2004/0017902 A1 * | 1/2004 | Oksman | H04L 12/66 379/93.28 |
| 2004/0062198 A1 * | 4/2004 | Pedersen et al. | 370/229 |
| 2004/0074668 A1 * | 4/2004 | Somers | 174/113 R |
| 2004/0146072 A1 * | 7/2004 | Farmwald | 370/537 |
| 2004/0153289 A1 * | 8/2004 | Casey et al. | 702/188 |
| 2004/0153577 A1 * | 8/2004 | Phillips et al. | 709/250 |
| 2005/0022007 A1 * | 1/2005 | Phillips et al. | 713/201 |
| 2005/0108763 A1 * | 5/2005 | Baran et al. | 725/87 |
| 2005/0129218 A1 * | 6/2005 | Kimble et al. | 379/325 |
| 2005/0135490 A1 * | 6/2005 | Zimler et al. | 375/257 |
| 2005/0201379 A1 * | 9/2005 | Zhang et al. | 370/395.1 |
| 2005/0213648 A1 * | 9/2005 | Chow | H04L 5/14 375/222 |
| 2005/0220180 A1 * | 10/2005 | Barlev | H04L 12/2856 375/222 |
| 2005/0288029 A1 * | 12/2005 | Jacobsen | H04W 16/04 455/447 |
| 2006/0023756 A1 * | 2/2006 | Meier | H04L 12/2801 370/537 |
| 2006/0062288 A1 * | 3/2006 | Hester | 375/222 |
| 2006/0109802 A1 * | 5/2006 | Zelig et al. | 370/258 |
| 2006/0133518 A1 * | 6/2006 | Zimler et al. | 375/257 |
| 2006/0176900 A1 | 8/2006 | Liu et al. | |
| 2006/0215689 A1 | 9/2006 | Liu et al. | |
| 2007/0030856 A1 * | 2/2007 | Cooke | H04M 11/062 370/401 |
| 2007/0274404 A1 * | 11/2007 | Papandriopoulos et al. | 375/260 |
| 2008/0043624 A1 * | 2/2008 | Matza | 370/235 |
| 2008/0075111 A1 | 3/2008 | Hu et al. | |
| 2008/0080389 A1 * | 4/2008 | Hart | H04L 41/12 370/252 |
| 2008/0159298 A1 * | 7/2008 | Peterson et al. | 370/395.53 |
| 2008/0170577 A1 * | 7/2008 | Sumou et al. | 370/400 |
| 2008/0232385 A1 * | 9/2008 | Suemura et al. | 370/406 |
| 2009/0067441 A1 * | 3/2009 | Ansari et al. | 370/401 |
| 2009/0092242 A1 | 4/2009 | Cooke et al. | |
| 2009/0097554 A1 * | 4/2009 | Savoor et al. | 375/240.08 |
| 2011/0090892 A1 | 4/2011 | Cooke | |
| 2011/0173673 A1 * | 7/2011 | Johnson | H04L 12/5691 725/118 |

OTHER PUBLICATIONS

Search Report and Written Opinion mailed Mar. 6, 2009 from corresponding International Application No. PCT/CA2008/001079.
International Search Report and Written Opinion issued on Sep. 18, 2015 in respect of International PCT Application PCT/CA2015/050517 (12 pages).

* cited by examiner

BONDED INTERCONNECTION OF LOCAL NETWORKS

CROSS-REFERENCE TO RELATED APPLICATION

The present application is a National Phase application of, and claims the benefit of, International (PCT) Application Serial No. PCT/CA2008/001079, filed on Jun. 9, 2008, the entire contents of which are incorporated herein by reference.

FIELD OF THE INVENTION

This invention relates generally to communications and, in particular, to communications between interconnected local networks.

BACKGROUND

DSL (Digital Subscriber Line) Rings, such as disclosed in U.S. patent application Ser. No. 11/463,240, filed on Aug. 8, 2006, and in U.S. Provisional Patent Application Ser. No. 60/706,022, filed on Aug. 8, 2005, the entire contents of both of which are incorporated herein by reference, represent a new and powerful reconfiguration of existing telecommunication network resources.

Such rings enable higher bandwidths to be achieved at greater distances from a CO (Central Office). As those skilled in the art will appreciate, the transmission bandwidth of technologies such as DSL and Ethernet decreases with distance. In a star network architecture for instance, a DSLAM (DSL Access Multiplexer) is physically located in the middle, but the distance to each subscriber is often greater than the relatively short distance required for maximum bandwidth. DSL Rings greatly increase the distance and bandwidth-carrying capability of the 'local loop'. High bandwidth is made available to households by reducing the transmission distance to the distance between households instead of the distance between households and COs. Maximum bandwidth can be obtained if the distance between households that are connected together is less than the maximum bandwidth distance.

Where households are separated by more than the maximum bandwidth distance, however, a DSL Ring might not be able to provide maximum bandwidth to all subscribers.

SUMMARY OF THE INVENTION

According to an aspect of the invention, an apparatus includes a cross-connect module to be operatively coupled to a local communication network, and first and second bonding interfaces operatively coupled to the cross-connect module. The interfaces terminate and thereby enable communications over respective first and second bonded links. The cross-connect module is operable to receive communication traffic, to determine whether the received communication traffic is to be forwarded to one or more of the local communication network, the first bonding interface, and the second bonding interface, and to forward the received communication traffic in accordance with the determination.

Where the communication traffic is received from the local communication network, the cross-connect module is operable to determine whether the received communication traffic is to be forwarded to one or more of the first bonding interface and the second bonding interface. For communication traffic received through one of the first and second bonding interfaces, the cross-connect module is operable to determine whether the received communication traffic is to be forwarded to one or more of the other of the first and second bonding interfaces and the local communication network.

The first and second bonded links may include the same or different numbers of constituent links. The first bonding interface terminates constituent links of the first bonded link, and the second bonding interface bonds together constituent links of the second bonded link.

In some embodiments, the first and second bonded links operatively couple the apparatus to respective first and second remote communication networks.

The cross-connect module may include a switch matrix operatively coupled to the first and second bonding interfaces and to the local communication network, and a controller operatively coupled to the switch matrix. The controller controls the switch matrix to switch the received communication traffic between the first bonding interface, the second bonding interface, and the local communication network, to thereby forward the received communication traffic in accordance with the determination.

The apparatus may also include a set of one or more traffic queues for storing the received communication traffic, the set of traffic queues being operatively coupled to the first and second bonding interfaces, to the local communication network, and to the switch matrix. In this case, the controller may be further operative to provide QoS (Quality of Service) forwarding for the received communication traffic. The received communication traffic is thus forwarded from the set of one or more queues.

The controller may provide the QoS forwarding by determining a priority of the received communication traffic and forwarding the received communication traffic further in accordance with the determined priority. The QoS forwarding could be implemented using one or more of: RPR (Resilient Packet Ring), Ethernet, and VDSL2 (Very high bit rate Digital Subscriber Line).

In some embodiments, the set of one or more traffic queues comprises receive queues for storing the received communication when received, and transmit queues for storing the received communication traffic prior to forwarding.

The apparatus may also include first and second local network interfaces that enable communications in the local communication network, and a traffic processor, operatively coupled to the first and second local network interfaces and to the cross-connect module, operable to transmit and receive communication traffic in the local communication network.

The first and second bonded links are DSL (Digital Subscriber Line) links, and the local communication network includes nodes operatively coupled together through DSL links in some embodiments.

A translation function to translate the received communication traffic may be provided by the cross-connect module. The translation function might include a function to translate the received communication traffic between RPR (Resilient Packet Ring) and Ethernet or ATM (Asynchronous Transfer Mode), for instance.

The local communication network is a ring network or a linear network in some embodiments.

It is also contemplated that the local communication network may be one of multiple local communication networks operatively coupled to the cross-connect module. The cross-connect module is then operable to determine whether the received communication traffic is to be forwarded to one or more of the local communication networks, the first bonding interface, and the second bonding interface, and to forward the received communication traffic in accordance with the determination.

The apparatus may include a third bonding interface, operatively coupled to the cross-connect module, that terminates and thereby enables communications over a third bonded link. In this case, the cross-connect module is operable to determine whether the received communication traffic is to be forwarded to one or more of the local communication network, the first bonding interface, the second bonding interface, and the third bonding interface, and to forward the received communication traffic in accordance with the determination. Two of the first, second, and third bonded links comprise respective communication links to a main communication network in some embodiments.

The communication links to the main communication network include respective sets of constituent links. If the local communication network is one of a plurality of local communication networks operatively coupled to the cross-connect module, the cross-connect module is operable to determine whether the received communication traffic is to be forwarded to one or more of the local communication networks, the first bonding interface, the second bonding interface, and the third bonding interface, and to forward the received communication traffic in accordance with the determination. The multiple local communication networks may be respective local communication networks associated with each of the communication links to the main communication network.

One of the first and second bonded links is a communication link to a main communication network in some embodiments.

An optical interface may be operatively coupled to the cross-connect module to enable communications with a main communication network over an optical communication link.

In some embodiments, a remote powering module is operatively coupled to a remote component through one or more electrically conductive twisted wire pairs. The remote powering module enables the apparatus to be at least partially powered by the remote component through the one or more twisted wire pairs.

Both an optical interface operatively coupled to the cross-connect module to enable communications with a main communication network over an optical communication link, and a remote powering module operatively coupled to a component of the main network through one or more electrically conductive twisted wire pairs to enable the apparatus to be at least partially powered by the component of the main network through the one or more twisted wire pairs, may be provided in some embodiments.

The apparatus may also include a wireless interface, operatively coupled to the cross-connect module, that enables the apparatus to communicate over a wireless communication link. The wireless interface may be one or more of: a WiFi interface and a femtocell interface, for example.

A method is also provided, and includes receiving communication traffic from a local communication network or one of first and second bonded links, determining whether the received communication traffic is to be forwarded to one or more of the local communication network, the first bonded link, and the second bonded link, and forwarding the received communication traffic in accordance with the determination.

Where the communication traffic is received from the local communication network, the determining involves determining whether the received communication traffic is to be forwarded to one or more of the first bonded link and the second bonded link.

If the communication traffic is received through one of the first and second bonded links, the determining involves determining whether the received communication traffic is to be forwarded to one or more of the other of the first and second bonded links and the local communication network.

As noted above, the first and second bonded links may include the same or different numbers of constituent links, and may enable communications with respective first and second remote communication networks.

The forwarding may involve forwarding further in accordance with a QoS mechanism. The QoS mechanism may involve determining a priority of the received communication traffic, and the forwarding then involves forwarding the received communication traffic further in accordance with the determined priority. The QoS mechanism might be implemented, for example, using one or more of: RPR, Ethernet, and VDSL2.

The first and second bonded links are DSL links, and the local communication network includes nodes operatively coupled together through DSL links in one embodiment.

The method may also include translating the received communication traffic. The translating might involve translating the received communication traffic between RPR and Ethernet or ATM.

As noted above, the local communication network may be a ring network or a linear network.

If the local communication network is one of multiple local communication networks, receiving involves receiving communication traffic from one of the local communication networks or one of the first and second bonded links, and determining involves determining whether the received communication traffic is to be forwarded to one or more of the local communication networks, the first bonded link, and the second bonded link.

In some embodiments, the method includes receiving communication traffic from a third bonded link, in which case determining involves determining whether the received communication traffic is to be forwarded to one or more of the local communication network, the first bonded link, the second bonded link, and the third bonded link.

Two of the first, second, and third bonded links may be respective communication links to a main communication network. These communication links to the main communication network include respective sets of constituent links. If the local communication network is one of multiple local communication networks, determining involves determining whether the received communication traffic is to be forwarded to one or more of the local communication networks, the first bonded link, the second bonded link, and the third bonded link, and the local communication networks may include a respective local communication network associated with each of the communication links to the main communication network.

One of the first and second bonded links is a communication link to a main communication network in some embodiments.

Such a method may be implemented, for example, in instructions stored on a computer-readable medium.

A further aspect of the invention provides a communication system that includes at least a first gateway node and a last gateway node serially coupled together through respective bonded links, and multiple local communication networks. Each of the local communication networks includes a respective one of the gateway nodes and at least one subscriber node for providing a communication service to subscriber premises. Each of at least the first gateway node and any intermediate gateway nodes between the first gateway node and the last gateway node includes a cross-connect module that receives communication traffic, determines whether the received communication traffic is to be forwarded to one or more of the local communication network and a bonded link that is operatively coupled to the gateway node, and forwards the received communication traffic in accordance with the determination.

In some embodiments, the gateway node and each subscriber node in each of the local communication networks includes a wireless interface for enabling wireless communications between the gateway node and each subscriber node in the local communication network.

The wireless interface may include at least one of: a WiFi interface and a femtocell interface, for example.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Embodiments of the present invention may be applied, for example, to DSL Rings as disclosed in the above-referenced patent applications. Therefore, a brief description of DSL Rings is provided below.

Star Topology

Those familiar with DSL communications will appreciate that in one known network topology for connecting copper pairs between households and a CO, many households or customer sites are interconnected with a single CO using twisted pair cables in a star network topology. The interconnections are generally referred to as the "last mile".

The transmission bandwidth of technologies such as DSL and Ethernet decreases with distance. In a star network architecture, the DSLAM (DSL Access Multiplexer) is physically located in the middle, but the distance to each subscriber is often greater than the short distance required for maximum bandwidth. Since the telecom carriers wish to increase bandwidth to their customers, they need to keep the twisted pair distances as short as possible.

Ring Topology

Figure 1:
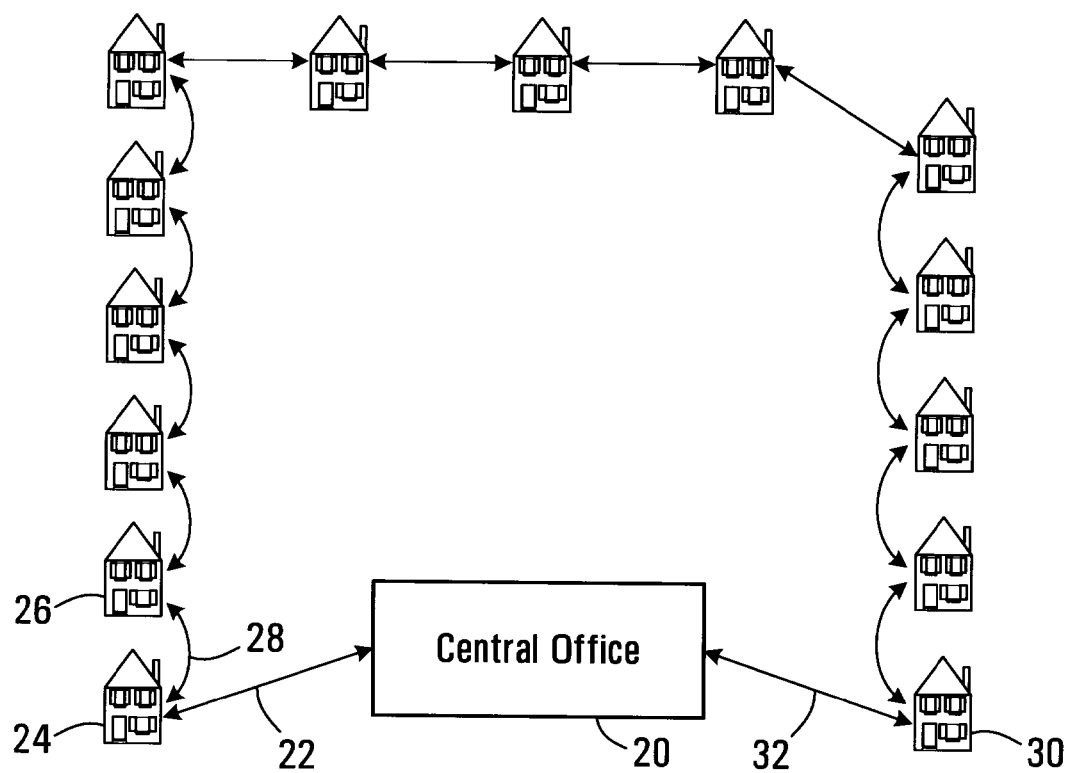
FIG. 1 is a block diagram of an example ring network topology for connecting copper pairs between households and a CO.

Referring now to FIG. 1, shown is an example ring network topology for connecting copper pairs between households and a CO. While throughout this description copper pairs are referred to, more generally any electrically conducting twisted wire pairs and possibly other types of connections can be employed. Many households 24, 26, . . . , 30 and a single CO 20 are interconnected using twisted pair cables in a ring network topology. More specifically, the CO 20 is connected to a first household 24 with twisted pair cables 22; the first household 24 is connected to second household 26 with twisted pair cable 28 and so on to the last household 30, which is connected to the CO 20 with twisted pair cables 32. Each household has a customer communications node that provides packet add/drop functionality. In a particular example, the customer communications node is an HCC (Home Communications Centre), which enables DSL ring topologies in telecom service provider networks. Example HCCs are described in detail below with reference to FIG. 2. A 'Ring' is a special case of the more general 'Daisy Chain of Add/Drop Multiplexers (ADMs)' where the 'Ring' goes out from, and returns to, the same gateway node, which may, but need not necessarily be, a CO. Another example would be a set of ADMs between two different COs or even a serially-connected network 'stub' sometimes referred to as a linear ADM (i.e., a set of ADMs that initiates from a particular gateway node, but terminates at another gateway node).

By physically, electrically, and/or logically connecting the twisted pair cables of customers so that the electrical distance is less than the maximum bandwidth distance of the layer 1 technology, service can be provided to subscribers at much greater distances from the DSLAM with very little investment in additional "last mile" cabling. Twisted pair rings greatly increase the distance and bandwidth carrying capability of the 'local loop'. High bandwidth is made available to the households by reducing the transmission distance to that between households instead of between households and gateway nodes or Central Offices. Maximum bandwidth is obtained if the distance between houses connected together is less than the maximum bandwidth distance.

In some embodiments, existing "last mile" cables are utilised by the ring network. Existing "last mile" cables may include several copper pair wires bundled together extending out from a CO to several households. Copper pair wires may exist between households, but are connected between the household and the CO. By appropriately cutting a copper pair wire between a second house downstream in the cable from a first house and the CO and routing the cut end to a second house, a connection between two households is established using the existing cable. This process may be repeated to form complete ring network topologies. There may exist intermediate, non-powered technician access points in the larger cables. In some cases it may be possible to achieve the ring topology by simply "jumpering" twisted pairs together inside these access points so that no actual "cutting of wires" is necessary.

In some implementations, once the new topology is available, a complete package of services with a documented feature evolution is implemented. The complete package may for example include combinations of features such as Internet Home Theatre or Internet Protocol TeleVision (IPTV), Automatic Meter Reading (AMR), Home Security Monitoring, Virtual Private Networking, Internet Security and Connection Maintenance (i.e., platform updates performed without customer intervention), and Medical Aid Monitoring.

HCC (Home Communications Centre)

Figure 2:
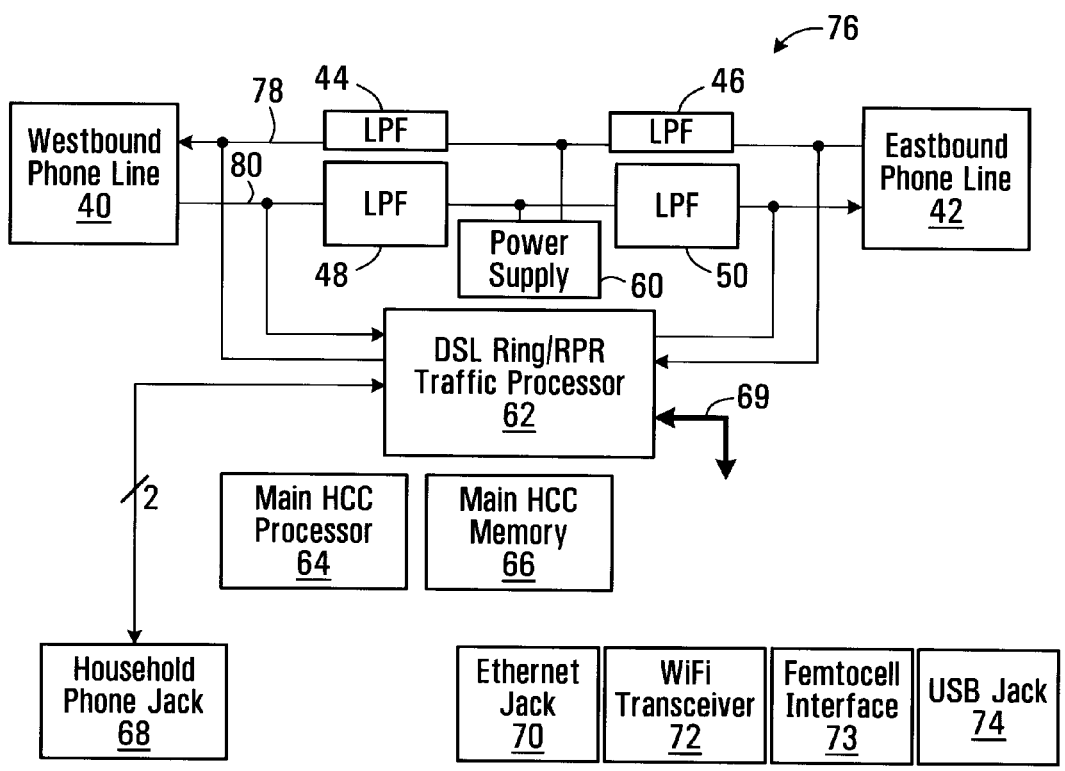
FIG. 2 is a block diagram of an example HCC (Home Communications Centre).

Referring now to FIG. 2, shown is a block diagram of an example HCC (Home Communications Centre) generally indicated at 76. It is to be understood that the HCC 76 shown in FIG. 2 is very specific for example purposes only. In general, equipment in conjunction with which an HCC may be implemented may include fewer, further, or different components, interconnected in a similar or different manner than shown.

The HCC 76 is coupled to a westbound phone line 40 and an eastbound phone line 42. References to "eastbound" and "westbound" do not of course necessarily imply east or west, but simply the two directions that the ring can be connected to a given HCC. Each phone line has a copper pair of wires. The HCC has a DSL Ring/RPR (Resilient Packet Ring) traffic processor 62 coupled to the westbound phone line 40 and the eastbound phone line 42. The HCC also has a main HCC processor 64 and a main HCC memory 66. A power supply 60 is coupled to the westbound phone line 40 and the eastbound phone line 42 via respective LPFs (low pass filters) 44, 46, 48, 50. A household phone jack 68 is coupled to the DSL Ring/RPR traffic processor 62. Other possible interfaces include an Ethernet jack 70, a WIFI transceiver 72, a femtocell interface 73, and a USB jack 74. There may be other components, but they are not shown for sake of simplicity. The traffic processor 62 has add/drop ports 69 that connect the various interfaces to the traffic processor.

In operation, the combination of the DSL Ring/RPR traffic processor 62, the main HCC processor 64, and the main HCC memory 66 is adapted to process all communications over the westbound phone line 40 and/or the eastbound phone line 42. Processing communications includes packet add/drop functionality. For example, if the DSL Ring/RPR traffic processor 62 receives a packet on the westbound phone line 40, it may handle the packet if it is addressed to the present HCC 76, or forward the packet to its destination via the eastbound phone line 42 if it is addressed to another HCC. In some implementations, packets are routed on a per packet basis. The HCC 76 may also generate packets associated with a local communication device and forward the packets to their destination. In some embodiments, protection switching of traffic is handled by an industry-standard protocol designed specifically for this task. An example of this would be RPR (IEEE 802.17) technology. RPR was developed for the optical transport infrastructure, but might also be adapted to fit well into this application.

There are two twisted copper pairs: the westbound phone line 40, and the eastbound phone line 42 (i.e., in opposite directions). In some implementations, communication over a phone line is bi-directional. In some embodiments, the data rate is symmetrical (i.e., transmit bit rate=receive bit rate) for both eastbound and westbound directions. In some embodiments, flow control mechanisms are used so that the data rate is the same around the ring and so that there are no links that are faster than others. A given household may communicate with the CO by an eastbound path and/or a westbound path. Communications with households may also be through a wireless mesh overlay via the WiFi and/or femtocell interfaces 72, 73, to provide for wireless backhaul for instance. In some implementations, if communication on a ring via one direction is not possible, then communication via the other direction is attempted.

Since a number of households are occupying a single ring, there is generally no baseband channel available for each household for analogue communication although it would be technically feasible to provide a single baseband channel in each direction, for example to a first household in each direction. As such (in the most likely scenario), conventional POTS (Plain Ordinary Telephone Service) communications such as telephone and FAX are also digitized and sent on the ring. Thus, communication over the eastbound phone line 42 and the westbound phone line 40 might be digital only, for example using DSL communication. Accordingly in some implementations, if analog devices, such as analog telephones and fax machines, are to be interfaced with the HCC 76, then the HCC needs to provide D/A (digital to analog) and A/D (analog to digital) conversions, though this is not necessary to support analog communications. Such conversions are not necessary for interfacing the HCC 76 with digital communication devices. Also, in such implementations, the CO ensures that communication transmitted to an HCC 76 is digital. Digital communication comprises data packet communication in one embodiment. DSL communication is one example of digital communication.

Another possible option would be to provide support for baseband POTS and implement each ring in the form of a DSL frequency overlay.

The household phone jack 68, the Ethernet jack 70, the WiFi transceiver 72, and the femtocell interface 73 provide communication interfaces for the household. The USB jack 74 may, in addition to providing a further communication interface, enable memory expansion and maintenance access for the HCC 76 when it is installed. The HCC 76 may be installed in a residence or business premises and remains with the residence/business premises permanently. This can be used to enable AMR (automatic meter reading) functionality, for instance. In some implementations, the architecture combines existing home phones with mobile phones. This may for example include most recent and/or backward compatible wireless interfaces. In some embodiments, the HCC 76 has one or more wireless interface(s), for example the WiFi (IEEE 802.11a/b/g/n) interface 72 and femtocell interface 73 to enable communication with wireless devices, such as wireless appliances, stereos, PCs, TVs, meters, mobile phones, Set Top Boxes (STBs), etc.

In some implementations, QoS (Quality of Service) is provided so as to provide certain communications with greater priority than other communications. A list of example communications with decreasing priorities may be VoIP (Voice over Internet Protocol) communication, streaming video communication, Internet Gaming, Business Services and non-streaming data communication. Having a greater priority provides streaming communication with a greater likelihood of being uninterrupted and having less latency and/or jitter. In some implementations, a COS (class of service) is used as detailed in the RPR specification so as to prioritize traffic on the ring. This enables carriers to sell what are referred to as SLAs (service level agreements) to their customers based on traffic volume at each priority level. For example, customer A might get X GB/month of Priority 1 traffic and Y GB/month of Priority 2 traffic, etc. while customer B may get totally different traffic profiles.

In some embodiments, the HCC 76 is partially powered from the phone lines so there is no dependency on household current supply for land line-based phone service. In some implementations, the household phone jack 68 and the traffic processor 62 are powered by at least one of the phone lines 40, 42 while the remaining components may be powered by household current (i.e., would have to be 'plugged in'). For example, each phone line could supply power via the potential difference between the first copper wire 78 at −48V and the second copper wire 80 at 0V in a DC-based architecture. The LPFs 44, 46, 48, 50 remove digital signals from the westbound phone line 40 and the eastbound phone line 42. By using power from the phone lines 40, 42, lightning threats to CO equipment are reduced, as the lightning strike could be eliminated or reduced by the first homes that it touches in either direction.

In some embodiments, the traffic processor 62 controls the traffic that is on the ring via the RPR protocol and VDSL2 standards. For such implementations, it also controls the VDSL2 interface chips. It will also control bandwidth asymmetry and any protection switching activity, for instance. The main processor 64 might for example implement functions such as the firewall/VPN, control of the WiFi interface, control communications with the network, access rule implementations (i.e., user authentication, WiFi interface logical segmentation between users, SLA policing, etc.), possibly interface conversions as necessary (e.g.: USB), etc.

The number of HCCs that may be interconnected in a ring network is implementation specific. An example design consideration is the maximum number of HCCs that can be partially powered solely from the phone line so as to enable high impedance user devices to operate during a power failure. A low current consumption user device is a user device that does not draw a significant amount of current and can be powered solely by a phone line. A telephone that does not require a power connection is an example of a low current consumption user device. Under normal conditions, each HCC is plugged in so that it receives power from its household power. However, during a power failure, the household power may be absent. In some embodiments, the HCC has a local power supply that receives power from the phone line so that during a power failure the local power supply partially powers the HCC and powers a high impedance user device so that the user may operate the high impedance user device. In such implementations, a user is provided with at least basic telephony functionality during a power failure.

The ring topology and the HCC involve modification to the "last mile". The "last mile" has been seen as 'untouchable' for many reasons. First, it provides the customer with the perception that the bandwidth they have is not shared with other customers. This is true only until the traffic reaches the first access multiplexer in the network. From that point onwards all bandwidth is shared. Second, the star topology allows the telecom carrier to provide power to older 'black' telephones (e.g.: those that do not have power cords) so that phone calls can still be made during a power failure. In some implementations, the HCC takes this into account and offers the capability to be powered from the telecom carrier Central Office (CO). Third, having a star topology means that no one else can 'listen' to another's phone calls, as there is no one else in the transmission path. In some implementations, the HCC provides similar capability via encryption.

Regarding the encryption of traffic, in some embodiments all traffic is encrypted around the ring so that no one will be able to 'listen' to another's traffic. The encryption may be end-to-end in nature (e.g.: between a user's PC and a server somewhere on the Internet) or simply around the ring as far as the gateway node (which will remove the encryption prior to sending it to the DSLAM in the CO).

It is to be understood that other implementations of the HCC are possible. In the HCC 76, specific example interfaces are shown. In one particular example, an HCC has an Internet firewall/VPN (Virtual Private Network), 2 or 3 phone jacks (RJ11), a USB port for memory expansion and maintenance access, a WiFi interface, a femtocell interface and one or more Ethernet cable jacks (RJ45). However, more generally, any suitable interface or combination of suitable interfaces may be implemented. Also in the illustrated example, processing is accomplished using a specific implementation of processors and memory. More generally, processing may be accomplished using any appropriate implementation of software, hardware, firmware, or any appropriate combination of software, hardware and firmware. The minimum functionality that needs to be included in each communications node is a traffic add/drop function. In the above example this is implemented in the traffic processor 62 but other implementations are possible.

Other Wireline Topologies

The above description has focused on a ring topology. However, it is to be understood that a ring topology is not required. More generally, any appropriate topology interconnecting communication nodes may be implemented. A "communication node" generally refers to any node adapted to communicate with other nodes. A communication node may be a customer communication node, which is a node having an HCC and being associated with a user or household, or a central office communication node, which is a node associated with a central office. At least one of the nodes functions as a network switching device to interconnect the subscriber ring to the network. This node accepts traffic from the ring and forwards it on, and receives traffic for the ring and puts it onto the ring. In the example of FIG. 1, the network switching device is the central office 20, while in the example of FIG. 3 described below, the network switching device is a gateway node in a pedestal; also known as a splice box or a distribution point. More generally still, the network switching device can be physically placed at any point, including mid-span, between the CO and the first customer. Of course, increasing the distance to the first customer will reduce the bandwidth capabilities on that link.

An example of another topology is a linear ADM or "Daisy Chain" topology. A linear ADM topology may be implemented whereby a set of communication nodes are connected together in series. A ring topology is a topology in which two end communication nodes are interconnected.

Other Ring Networks

Figure 3:
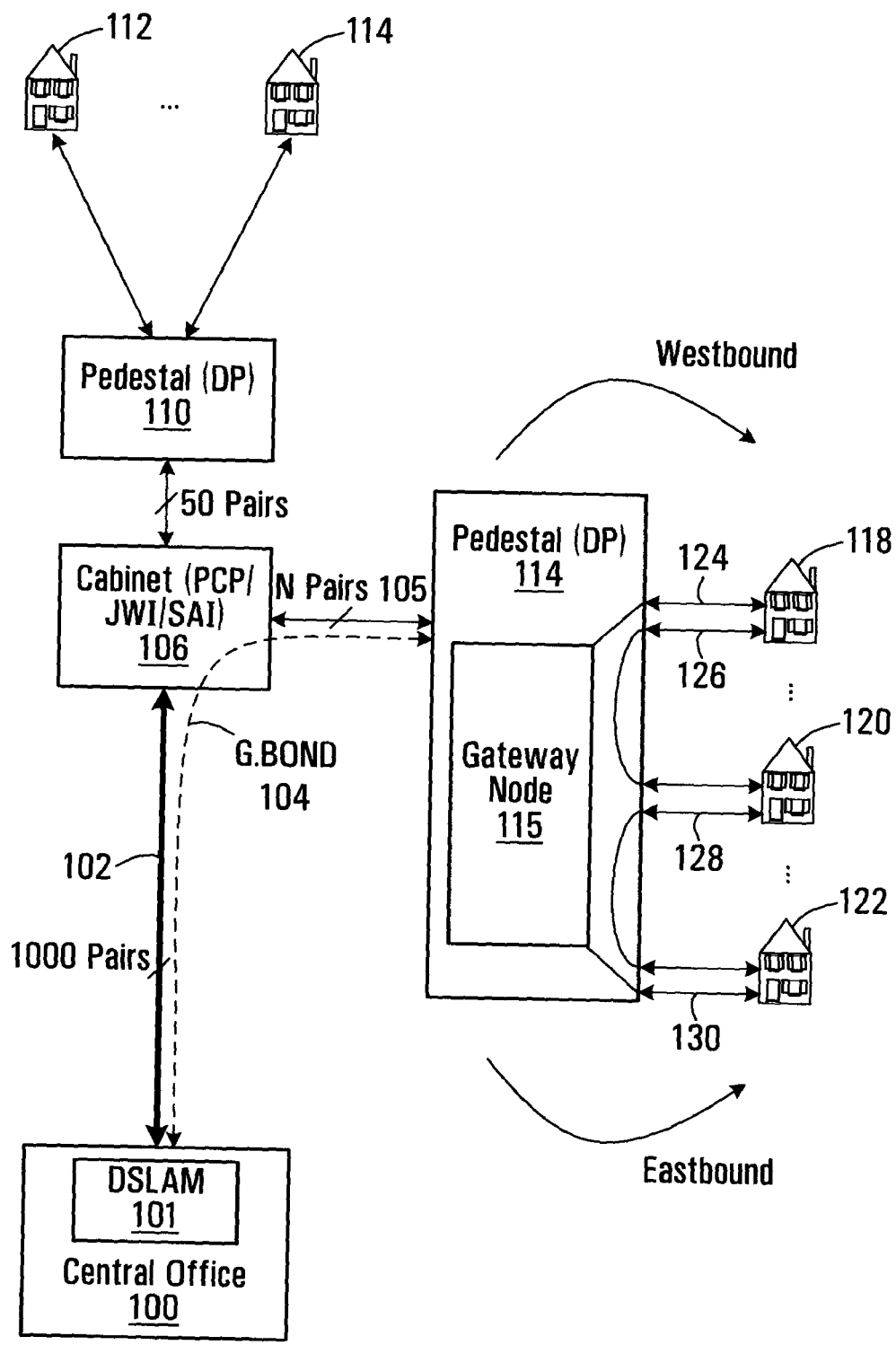
FIG. 3 is a block diagram of another network containing both a star implementation and a ring network topology.

Referring now to FIG. 3, another example of a DSL ring network is shown. A set of households 118, 120, 122 is connected in a ring configuration. The first household 118 is connected via 124 to a gateway node 115 forming part of a pedestal or DP (Distribution Point) 114. Similarly, household 122 is connected via 130 to the gateway node 115. The remaining households are connected in a ring similar to that of FIG. 1, but in this case the connections between consecutive houses on the ring go back through the pedestal 114. Thus, a connection 126 is shown between households 118 and 120, and a connection 128 is shown between households 120 and 122. More generally, an arbitrary number of households would be included on the ring. The pedestal 114 is shown connected via N Pairs 105 to a cabinet 106 (often called a Primary Connection Point—PCP—or Jumper Wiring Interface—JWI—or Service Access Interface—SAI— depending on the terminology of the network operator) which in turn is connected to a CO 100 having a DSLAM 101. The pedestal 114 is connected to the CO 100 via the N Pairs 105 and N of the 1000 pairs 102 in a manner similar to that described in G.Bond (ITU 998.1/2/3) 104. For the purpose of comparison, also shown is a conventional pedestal 110 connected to households 112, 114 in a star topology.

A pedestal typically includes a number of incoming pairs from a network, and a patch panel that allows the connection of any pair going to a specific household to any of the incoming pairs. Thus for the conventional pedestal 110, the patch panel would allow households 112, 114 to be arbitrarily connected to respective ones of the 50 pairs incoming to the pedestal 110.

For the pedestal 114 that is participating in the DSL ring, only pairs 124 and 130 are connected to the gateway node 115. The remaining connections are between adjacent households. This can be achieved by making connections on a patch panel that forms part of the pedestal 114. For example, the interconnection 126 between households 118 and 120 can be achieved by connecting a jumper cable between a first pair going from the pedestal 114 to the first household 118, and a second pair going to the second household 120. In this manner the configuration of the DSL ring is very flexible and can easily be changed by simply modifying the set of patches. In the illustrated example, the bandwidth from the CO 100 to the pedestal 114 is provided through a bonding approach.

In particular, a set of pairs from the DSLAM 101 can be grouped as a logical pipe that provides higher bandwidth than individual pairs. This logical pipe is then used to transmit packets to and from the gateway node 115 and any of the households on the DSL ring. For example, assuming individual pairs between the DSLAM 101 and the gateway node 115 support 4 Mb/s each, this being a function of the distance between the DSLAM 101 and the gateway node 115, and 32 such pairs can be combined to produce 128 Mb/s bandwidth, this bandwidth may be passed around the ring with 64 Mb, or in any other proportion desired, being transmitted in each direction by the gateway node 115. Regarding the availability of double the maximum VDSL2 bandwidth, home routers may be able to handle less than this amount, for example 100 Mb/s. This would not pose a problem so long as there is not more than that amount of traffic to drop at a given household or the household had high capacity equipment such as a GigE router. The maximum current VDSL2 ring bandwidth in a symmetrical implementation is just over 200 Mb/s.

Figure 4:
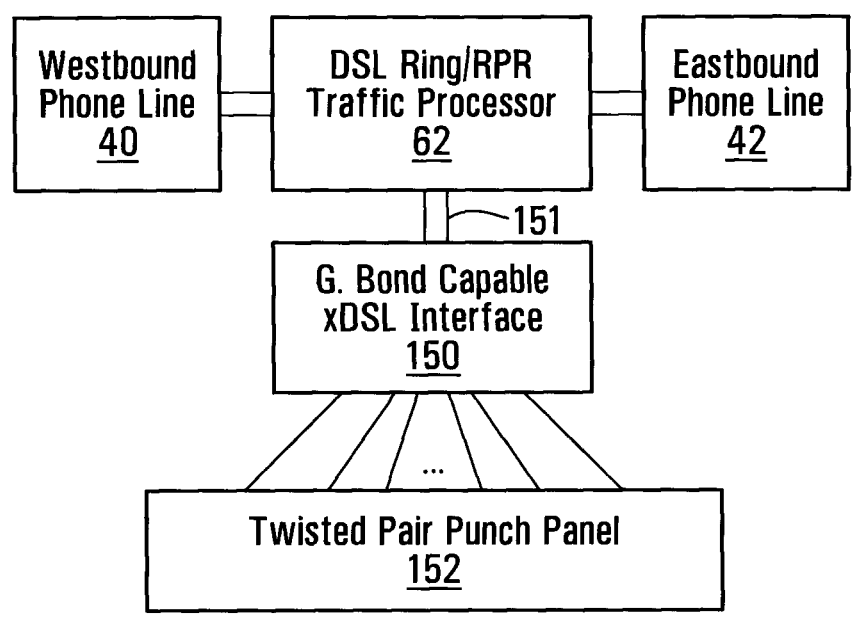
FIG. 4 is a block diagram of an example gateway node.

In some embodiments, the gateway node 115 behaves very much the same as the HCC on any of the households. FIG. 4 shows additional functionality that might be included in some gateway node implementations. This includes a G.Bond-capable xDSL interface 150 and a twisted pair punch panel 152. More generally, any set of components capable of exchanging traffic with the main network and the DSL ring can be used. This can be included in a gateway node that also includes a traffic processor 62 that is basically the same as in the HCC described above. In this case, the G.Bond-capable interface 150 behaves in the same way as a communications device on the above described HCC, and is shown connected to an add/drop port 151 of the traffic processor 62; the only difference here is that substantially all of the traffic will be going to/from that device, with the possible exception of any traffic that might be terminated at the gateway node per se. A gateway node may include additional communications interfaces such as USB port(s), WiFi ports, a femtocell interface, etc., as described for the HCC 76 (FIG. 2).

As can be seen from FIG. 3, the G.Bond protocol 104 is used to obtain maximum bandwidth from the CO 100 to the pedestal 114. The gateway node 115, which may be environmentally hardened and powered via the twisted pairs from the CO 100, terminates the G.Bond 104 traffic and acts as a gateway for the DSL ring.

In some embodiments, at each node in the ring is a full ADM, based on VDSL2. The DSL transmission distance starts at zero again on each individual hop. In most cases these hops back to the pedestal and then to the neighbour's house are less than 300 meters (<1000 ft). VDSL2 bandwidth at this distance is in the >100 Mb/s range (depending on the VDSL2 chipset manufacturer's specifications and the cable quality).

With rings there are two paths into and out of each house, each with the potential capability of carrying >100 Mb/s. Therefore the bandwidth potential for this scenario is potentially greater than 200 Mb/s (100 Mb/s eastbound and 100 Mb/s westbound) depending on the number of bonded pairs and the actual distance from the DSLAM to the pedestal. Basically the greater the number of subscribers on the ring, the greater the bandwidth pool available due to the greater number N of pairs available for bonding in the G.Bond 104 stream.

Rings also have the advantage of protecting themselves such that, if a single pair on the ring is cut, the traffic can be sent in the opposite direction to get to the gateway node. This is incredibly useful for maintenance purposes as well as adding and removing nodes (houses) to/from the ring. This allows for a deployment business case based on customer demand which eliminates the sunken investment in a 'build it and they will come' approach. This is also true of bonding so that houses can be added to the ring as subscribers sign up for the service.

In some embodiments, Local Loop Unbundling (LLU) is accomplished. In some embodiments this is achieved using the logical separation that is currently done via co-location in the CO (i.e., the traffic is carried by the incumbent from the customer to the CO and then handed off). In other embodiments, another gateway node is installed in the pedestal along with co-location in the CO. This allows for physical separation of the rings on a carrier-by-carrier basis. Space considerations in the pedestal may become an issue depending on the number of carriers that need to be supported in this fashion. A more pragmatic approach would have competitive carriers paying for the CPE (customer premises equipment) and jumper installation in the pedestal.

In another embodiment, a wireless interface can be used through which the reach of the wireline network can be extended to reach other devices not connected directly by wireline connections. A second set of households can be connected in a similar manner as described for the main network (the network described in previous embodiments), with wireline connections between pairs of households in a linear manner that might form a ring or linear ADM for example. At least one of the households of the second set has a wireless connection to one of the households of the first set on the ring, to thereby connect the second set of households into the ring.

In some embodiments, as described above, a wireless interface is available for performing protection switching in the event of failure of one or more wireline connections.

In some embodiments, a wireless connection can be used between the endpoints of two linear ADM topologies to complete a ring topology.

In some embodiments, the ring transmission protocol is based on the IEEE 802.17 RPR standard with some modifications to allow for different possible bandwidths between nodes and overall lower peak bandwidths. RPR was designed for metro optical networks. Ethernet-based rings, implementing Ethernet Automatic Protection Switching (EAPS) according to ITU-T Recommendation G.8031/Y.1342, for instance, are also contemplated.

In some embodiments, packet add/drop functionality is included in each node to add/drop packets. More generally, traffic add/drop functionality is included. This might include packet add/drop functionality, or traffic implemented using timeslots or wavelengths/frequencies to name a few specific examples.

In some embodiments, the packet add/drop is in respect of DSL communication. This may for example be ADSL (Asynchronous DSL), ADSL2+ (Asynchronous DSL Version 2+), SDSL (Symmetric DSL), Uni-DSL (Universal DSL), VDSL (Very high bit rate DSL), and VDSL2 (Very high bit rate DSL version 2) or a future iteration of DSL that may or may not include Dynamic Spectrum Management (DSM) functionality.

As noted above, embodiments of the present invention may be applied to DSL Rings. It should be appreciated, however, that FIGS. 1 to 4 and the foregoing description are intended solely as illustrative examples of the types of networks or topologies in conjunction with which embodiments of the invention may be implemented. Thus, the present invention is not necessarily limited to any particular types of network, topology, equipment, or protocols, for instance.

Overview

Turning now to aspects of the present invention in more detail, one aspect of the invention relates to interconnecting rings through bonded links, so as to further extend the reach of DSL communications while providing the benefits of ring topologies such as those described above. Multiple DSL Rings, or multiple COs with one or more DSL Rings between them, are chained together so that maximum bandwidth can be obtained at maximum distance from a CO in some embodiments. For example, in one possible application, embodiments of the invention are implemented to provide up to 400 Mb/s bandwidth to suburban and rural areas in which subscribers are separated by distances, illustratively on the order of kilometers, which would be significantly larger than the maximum bandwidth distance.

Figure 5:
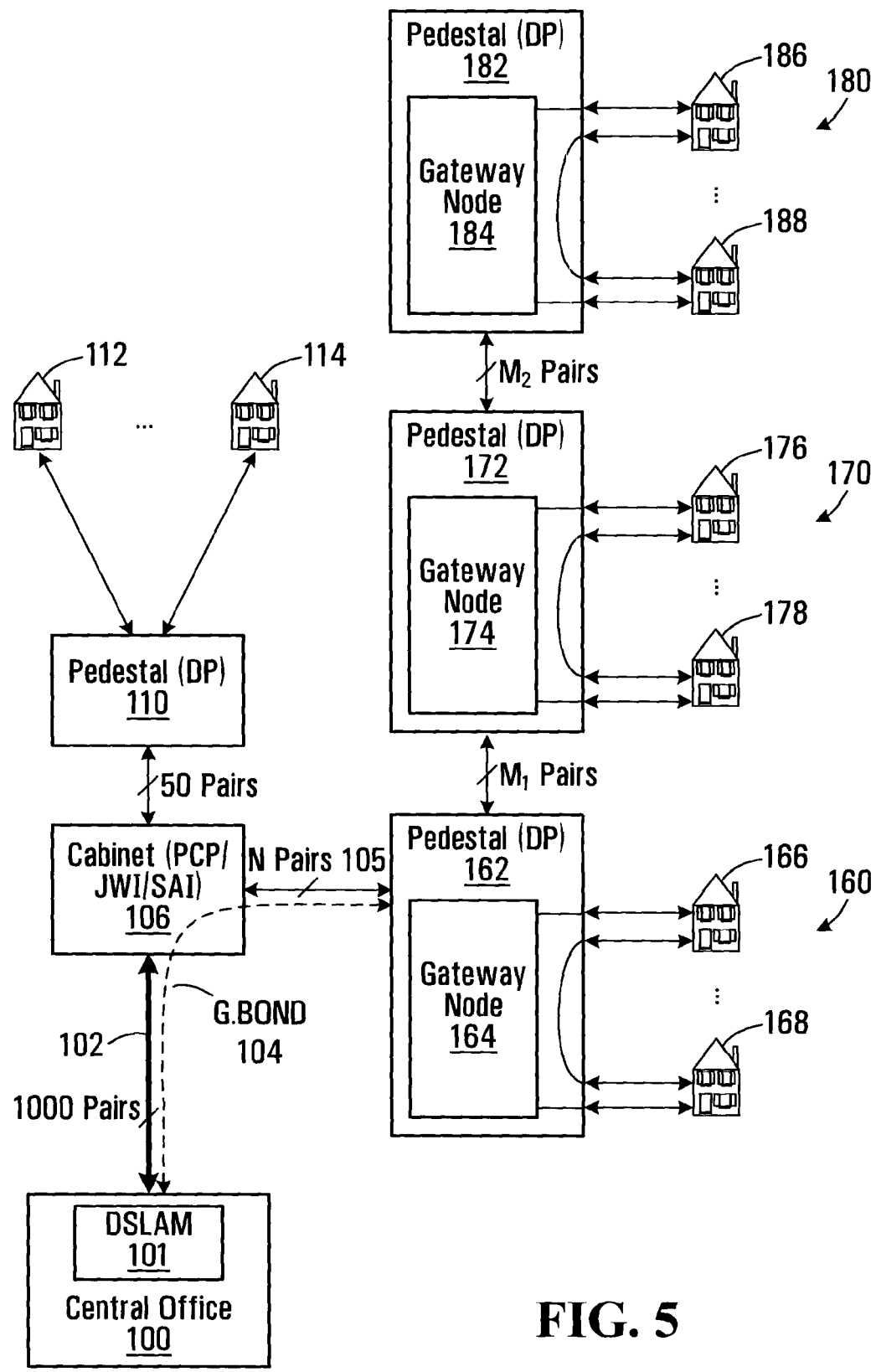
FIG. 5 is a block diagram of an example interconnected ring network topology.

FIG. 5 is a block diagram of an example interconnected ring network topology. As shown, this topology includes a DSLAM 101 located at a CO 100, a cabinet 106 connected to the CO through multiple pairs 102, and three interconnected ring networks 160, 170, 180. The first ring 160 is connected to the cabinet 106 through N pairs 105, the second ring 170 is connected to the first ring through $M_1$ pairs, and the third ring is connected to the second ring through $M_2$ pairs. Each ring 160, 170, 180 includes a pedestal, sometimes referred to as a splice box or distribution point, 162, 172, 182 having a gateway node 164, 174, 184 and one or more subscriber premises, two of which are shown as households 166/168, 176/178, 186/188 in each ring.

The topology shown in FIG. 5 is intended solely for illustrative purposes. An actual implementation may include further, fewer, or different components, interconnected in a similar or different manner than explicitly shown. For instance, the example topology might be used in a rural setting where there may be a string of pedestals (or splice boxes) that serve single residences only. In this case, a ring would be a 2-node ring, meaning a residence and a gateway node are the only nodes on that ring.

It should also be appreciated that G.Bond is one example of a bonding technique. Different bonding techniques, such as bonding according to IEEE 802.3ad Link Aggregation for instance, may instead be used.

The topology shown in FIG. 5 is also intended as an example. A chain of rings need not necessarily be implemented as a "stub" which terminates in a ring. For instance, a further bonded link could be provided back to the CO 100 from the ring 180, to thereby form a collector ring to which the subscriber rings 160, 170, 180 are coupled. This would provide additional redundancy in the case of cable cuts or other failures. In another possible scenario, the last bonded link is actually an interconnection to another CO rather than a local ring.

In a Fiber-To-The-Node (FTTN) or remote office case, the DSLAM 101 is not physically located in the CO 100 but in a remote cabinet, brick hut, or shed, for example.

Other variations are also possible.

Figure 6:
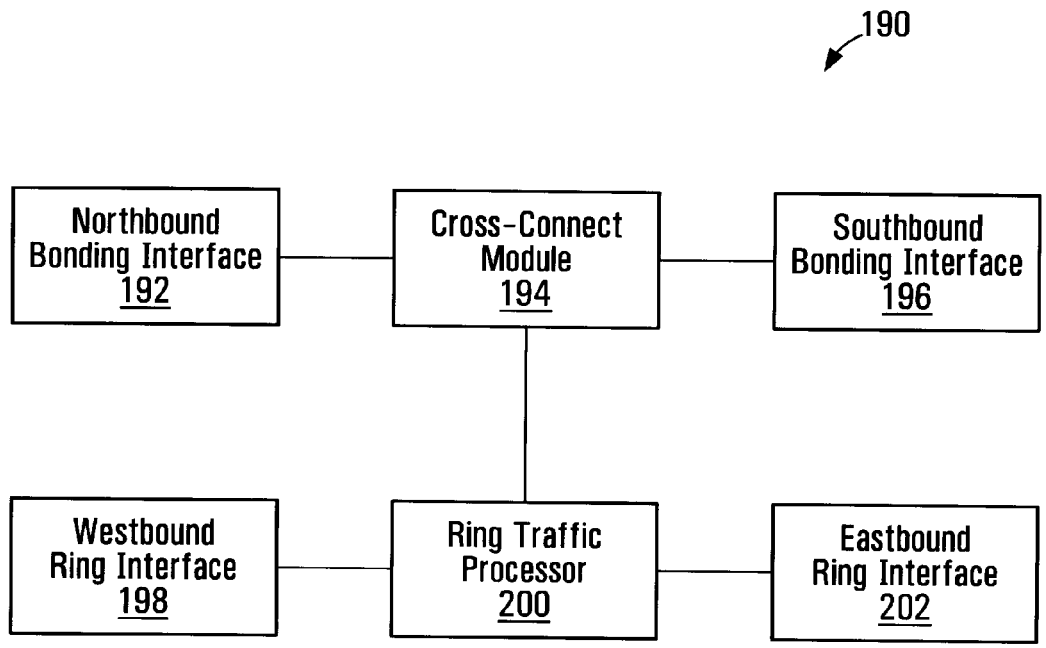
FIG. 6 is a block diagram of an example gateway node.
Figure 7:
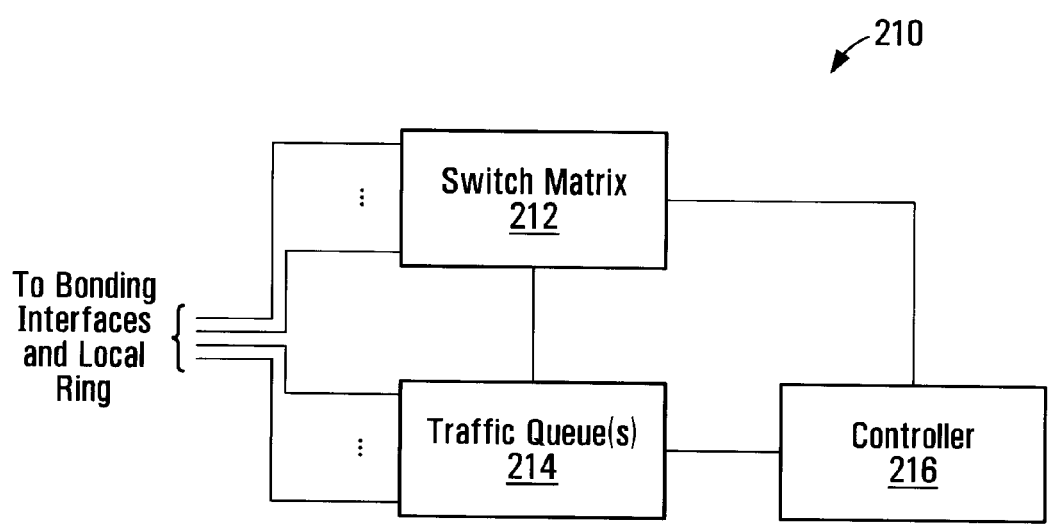
FIG. 7 is a block diagram of an example gateway node cross-connect module.
Figure 8:
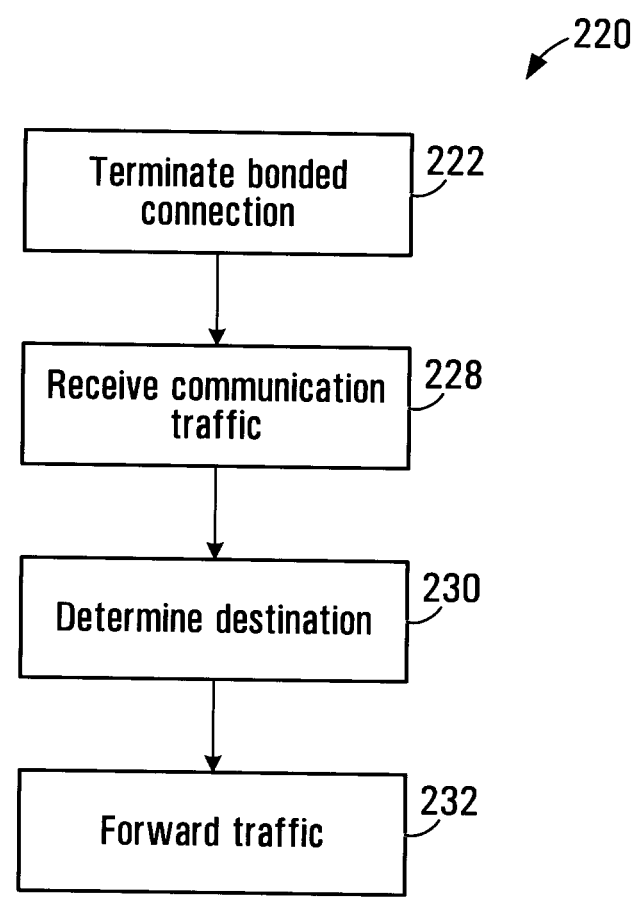
FIG. 8 is a flow diagram of a method according to an embodiment of the invention.

More generally, it should be appreciated that the contents of FIG. 5, as well as FIGS. 6 to 8, represent non-limiting embodiments of the invention.

At the main network side, the CO 100 and the cabinet 106 may be identical to the corresponding components shown in FIG. 3. The main network may still provide service to a star topology including the pedestal 100 and households 112, 114, for example. Other functions at the main network side may also be unaffected by the interconnection of multiple rings 160, 170, 180 as shown in FIG. 5.

In the rings themselves, the pedestals 162, 172, 182, and in particular the gateway nodes 164, 174, 184, support additional functions to enable the ring interconnections. The first gateway node 164 terminates all available twisted pairs, depending on the number of pairs available and who owns them. In the example shown, this may include all of the N pairs 105. Terminating all pairs between the pedestal 162 and the CO 100, regardless of whether or not they are actually connected to houses on the ring 160, provides access to unused bandwidth on the copper pairs that might otherwise be used for subscribers who are only requesting POTS service.

These pairs, or more accurately all the available frequency bands on these pairs, are then logically bonded into a single communications link from the pedestal 162 back to the CO 100 or other communications traffic aggregation point, as shown at 104. Although only a single bonded link is shown at 104, respective subsets of the available pairs can be bonded to form multiple independent bonded links back to the CO 100, to be used for carrying different kinds or priorities of traffic, for example.

Once all the pairs, or their available frequency bands, are terminated, the pairs that connect to the premises 166, 168 serviced by the pedestal 162 are used to create the ring 160, which services those premises. Traffic from the local ring 160 may be added to any traffic generated by the downstream rings 170, 180 for transmission back to the CO 100.

The pairs that are terminated by the gateway node 164 at the pedestal 162 but are not dropped at the pedestal, i.e., any additional pairs that do not physically end at the ring 160, or strictly the frequency bands available on those pairs, can be logically bonded together by the gateway node 164 to create a single high-bandwidth link to the next pedestal 172 in the chain, and in some embodiments to also provide electrical power to the downstream rings 170, 180.

These pairs can carry all traffic to and from the next pedestal 172. When those pairs reach the next pedestal 172 (or splice box) they are terminated at the next gateway node 174. In the example shown, $M_1$ pairs are bonded between the first and second gateway nodes 164, 174 and terminated at the second gateway node.

As described above for the first gateway node 164, the second gateway node 174 terminates the $M_1$ pairs through which it is connected. In the example shown, $M_2$ additional pairs are bonded to form a bonded link to the third gateway node 184. The third gateway node 184 is the last gateway node in this example, and all $M_2$ pairs physically end at the pedestal 182 or in its local ring 180.

At the first and second gateway nodes 164, 174, if received traffic is destined for the local ring 160, 170 that drops from the corresponding pedestal 162, 172, the traffic is dropped to that ring. If the traffic is destined for another downstream ring 170, 180, it is passed on through a bonded link. In one embodiment, the passthrough function is provided via a QoS-enabled switch matrix or cross-connect that may, for example, be Ethernet-based or RPR-based.

In order to minimize delay at gateway node cross-connects for latency-sensitive traffic, minimal traffic queue sizes and a high-priority-weighted fairness forwarding implementation could be used. Latency-sensitive traffic could then be assigned high-priority status and handled accordingly.

The last gateway node 184 in a chain need not necessarily support the passthrough function since all traffic it receives from upstream nodes should be destined to its local ring 180. However, it is possible to have all gateway nodes in a chain support the passthrough function in order to support future expansion of a chain, for instance.

FIG. 6 is a block diagram of an example gateway node 190, which may be provided at least at a first pedestal and intermediate pedestals in a chained ring topology. A gateway node 190 could be provided at each of the pedestals 162, 172 (FIG. 5), for example. The gateway node 182 may have substantially the same structure as well, although cross-connect functionality and one of the bonding interfaces would not be needed in a far-end gateway node as noted above.

The example node 190 includes a cross-connect module 194 operatively coupled to a northbound bonding interface 192, to a southbound bonding interface 196, and to a ring traffic processor 200, which is operatively coupled to a westbound ring interface 198 and an eastbound ring interface 202. The directional labels on the interfaces 192, 196, 198, 202 are for the purposes of distinguishing directions along the chain and for distinguishing the chain or interconnect bonding interfaces 192, 196 from the ring interfaces 198, 202. These labels do not denote any dependence on actual interface locations or geographic directions of transmission of communication traffic through those interfaces.

Other components may also be provided in communication equipment in or in conjunction with which the gateway node 190 is implemented, but have not been explicitly shown in FIG. 6 in order to avoid overly complicating the drawing. A main processor and a main memory, for example, might be provided for implementing the cross-connection functionality and/or other functions, for example, as discussed above with reference to the main HCC processor 64 and the main HCC memory 66 in FIG. 2.

The bonding interfaces 192, 196 enable communications over respective bonded links. In one embodiment, the constituent links that make up each bonded link are twisted pairs, or the frequencies used on such pairs, that have been logically bonded together to form one logical communication link. As discussed above with reference to FIG. 5, the bonded links at each side of a gateway node may include different numbers of constituent links. In some embodiments, the bonded links include the same number of constituent links.

References herein to links or bonded links are intended to include physical connections and/or logical connections. For example, twisted pairs are physical connections, and the frequencies available on those physical connections can be bonded together to form a bonded link. The pairs, the frequencies available on those pairs, or both, may be considered examples of links in the context of the present application.

Each of the interfaces 192, 196 may be a G.Bond-capable xDSL interface such as the interface 150 (FIG. 4). It will thus be apparent that the gateway node 190 may be substantially similar to the gateway node shown in FIG. 4, although with an extra interface to a bonded link and a cross-connect module 194. The exact structure and function of the bonded interfaces 192, 196 will be implementation-dependent. In other embodiments, the bonding interfaces 192, 196 implement IEEE 802.3ad Link Aggregation. It would also be possible to implement different types of bonding interfaces in the same gateway node, although in most implementations, it is expected that the bonding interfaces 192, 196 will be of the same type.

Communication traffic flow between interconnected rings, and also to and from a local ring, is controlled by the cross-connect module 194, which may be implemented in hardware, software, firmware, or a combination thereof. Traffic passthrough along a chain of rings, addition of traffic to the chain for transmission from a local ring, and dropping of traffic to the local ring are handled by the cross-connect module 194. Microprocessors, Application Specific Integrated Circuits (ASICs), Programmable Logic Devices (PLDs), and Field Programmable Gate Arrays (FPGAs) are examples of devices that might be used to implement the cross-connect module 194. Given the wide range of implementation choices available for the cross-connect module 194, this module is described in detail below primarily in terms of its function. The functional description provided herein would enable a person skilled in the art to implement embodiments of the invention in any of various ways.

The ring interfaces 198, 202 enable the gateway node 190 to communicate with the first and last subscriber premises on a local ring. The local ring is constructed by using twisted pairs to connect subscriber premises equipment in one embodiment, and in this case the ring interfaces 198, 202 are twisted pair interfaces.

The ring traffic processor 200 may be substantially the same in structure and function as the traffic processor 62 (FIGS. 2 and 4), which has been described above. The addition of the cross-connect module 194 and the two bonding interfaces 192, 196 instead of one need not affect the operation of local ring components such as the ring traffic processor 200 and the ring interfaces 198, 202. The local ring components operate in substantially the same way whether implemented in a single ring or a chained ring topology.

Operation of the gateway node 190 will now be considered in further detail with reference to FIGS. 5 and 6. In the downstream direction, from the main network to a subscriber, the CO 100 sends traffic on the bonded DSL link shown at 104 to the gateway node 164, which resides in the wiring pedestal 162. For the purposes of this illustration, it will be assumed that a single binder group (typically 24 or 25 copper twisted pairs) is passed from the CO 100 to the pedestal 162, and that a single Telco owns the binder group. It will also be assumed that there are 3 subscriber premises serviced by each pedestal 162, 172, 182, each with at least 2 pairs connecting them to the pedestal. To implement the ring 160 from the pedestal 162 only (i.e., using only jumper wires) 2 pairs are connected from the pedestal to each subscriber premises 166, 168. One pair from the subscriber premises 166 is jumpered to one of the pairs of the next subscriber premises 168, and so on, in embodiments including more than two subscriber premises on a local ring, until one pair from the last subscriber premises 168 is connected back to the pedestal gateway node 164.

The first gateway node 162 that the binder group encounters terminates all pairs even if the subscriber premises that they are originally destined for are serviced by another pedestal 172, 182 further downstream. This may or may not apply to customers who prefer to still receive POTS-only service. As there are different physical implementations of that case, only the case of pseudo-POTS, where POTS traffic is converted to VoIP in an HCC prior to being put on a ring will be considered in this illustration. One possible mechanism for supporting POTS-only service has been disclosed in U.S. Patent Application Ser. No. 60/977,381, filed on Oct. 4, 2007, entitled "REMOTE POWERING OF DSL ADMS", the entire contents of which are incorporated herein by reference.

All of the communication traffic from the CO 100 is fed into the cross-connect module 194 in the first gateway node 164 at the pedestal 162, through its upstream bonding interface, illustratively the bonding interface 192. The cross-connect module 194, which as described below may support such traffic handling functions as CoS and QoS, on the basis of traffic priorities for instance, determines whether the traffic is destined for the subscriber premises serviced by its own pedestal 162 or another pedestal 172, 182 further downstream. If the received traffic is destined for subscribers serviced by the pedestal 162, or the gateway node 164 itself in the case of control packets, the cross-connect module 194 drops the received traffic to the local ring that originates from the gateway node. Control packets remain in the gateway node 164. Traffic to be dropped to the local ring is passed to the ring traffic processor 200, where the decision of which direction to send the traffic around the ring is made, as described above. The traffic is then passed to its destination via the local ring.

If the cross-connect module 194 determines that the received traffic is not destined for its own local ring (i.e., it is passthrough traffic), it passes that traffic to the downstream bonding interface, which is the bonding interface 196 in this example. The bonding interface 196 logically bonds several ($M_1$) pairs together. The number of pairs that are bonded together at the bonding interface 196 might be chosen so that the maximum possible xDSL bandwidth is available between the pedestals 162, 172. As the distance to the next pedestal 172 is likely less than the distance from the CO 100 to the first pedestal 162, it is also likely that fewer pairs would need to be bonded together to achieve the maximum bandwidth.

Separate power pairs may also be used in the downstream case. Typically, twisted pair cable that holds a single binder group is installed when a twisted pair network is being deployed. At each pedestal, the cable is brought out of the ground to the surface, a few pairs are broken out, and the cable is put back into the ground. The "tails" of the broken out pairs are virtually always left in the cable and are generally called "bridged taps". In some cases, the pairs that are broken out of the cable are not cut, but just partially stripped to be put into the punch block. This can actually cause electrical issues that in turn create problems for DSL communications. In this respect, embodiments of the present invention can provide a further advantage in that these bridged taps are eliminated by terminating all pairs at each pedestal. The "tails" that are still physically in the cable bundle but might not normally be connected to anything can still be used, however, for downstream bonded links and/or powering downstream components.

The passthrough traffic is received at the next pedestal 172 through its upstream bonding interface 192 and then fed into the cross-connect module 194. The same determination of drop or passthrough is made and the same actions are undertaken. In this example there are 3 gateway nodes 162, 172, 182 that are daisy-chained together in this manner. In the last gateway node 182, it is not necessary to implement a cross-connect module 194 or a downstream bonding interface 196, however, since all traffic forwarded to the gateway node 184 should be destined either for the gateway node itself or the last ring 180. The last gateway node 182 may thus be the same as the gateway node 115 (FIG. 3) in some embodiments. The cross-connect module 194 and a downstream bonding interface 196 could still be implemented in the gateway node 184 to provide for future expansion.

In the upstream direction, starting at the last gateway node 184 in the chain, traffic is added to the ring 180 by any of the subscriber premises 186, 188 serviced by the pedestal 182. The traffic is forwarded to the upstream bonding interface 192 at the gateway node 184 once it is recognized that the traffic is destined for the main network or an upstream ring 160, 170. This traffic could include control traffic generated by the gateway node 184 and destined for the network or upstream gateway nodes 164, 174. The upstream bonding interface 192 forwards the traffic to the next gateway node 174 in the chain. At the second gateway node 174, the traffic is fed into the cross-connect module 194 through the downstream bonding interface 196. The cross-connect module 194 determines the destination of the traffic and drops it to the ring traffic processor 200 of the local ring and/or passes it towards the network on its upstream bonding interface 192. This process may continue, depending on the destination of the traffic, at the gateway node 164 and possibly until the traffic is terminated at the DSLAM 101 in the CO 100.

The cross-connect module 194 may support functions such as QoS, as described in further detail below, and/or efficient multicast. Efficient multicast allows for a single instance of some traffic to be sent to multiple end points instead of the standard Ethernet implementation of uni-cast. Efficient multicast is a standard feature of RPR. One example of traffic that might be sent via the efficient multicast facility are femtocell synchronization packets. Femtocells are new, small cell sites that would physically reside in a house. To allow for hitless call hand-off between these small cell sites, which could be implemented in an HCC for example, femtocell nodes are synchronized with each other to a very high degree. In one possible implementation, a single packet would be sent from a DSLAM in a CO and have the highest priority attached to it. The packet would be received at the cross-connect module in the first pedestal, where it would drop to the local ring and continue to the next gateway node. Other types of traffic may also be subject to such multicast or multi-destination handling.

A gateway node thus represents one example of an apparatus having a cross-connect module 194 to be operatively coupled to a local ring communication network, and first and second bonding interfaces 192, 196, operatively coupled to the cross-connect module, that terminate and thereby enable communications over respective first and second bonded links. In the case of the first gateway node 164, the upstream bonding interface 192 might couple the gateway node to the CO 100 through the cabinet 106 and the downstream bonding interface 196 might couple the gateway node to a remote ring 170, or in some cases to another CO. The bonding interfaces 192, 196 of the second gateway node 174, however, couple the gateway node to respective remote rings 160, 180, through their corresponding gateway nodes 164, 184.

The cross-connect module 194 is operable to receive communication traffic, to determine whether the received communication traffic is to be forwarded to one or more of the local ring communication network and the first and second bonding interfaces 192, 196, and to forward the received communication traffic in accordance with the determination.

As described in detail above, where the communication traffic is received from the local ring communication network, through the ring traffic processor 200, the cross-connect module 194 is operable to determine whether the received communication traffic is to be forwarded to one or more of the first bonding interface 192 and the second bonding interface 196. If communication traffic is received through one of the first and second bonding interfaces 192, 196, the cross-connect module 194 determines whether the received communication traffic is to be forwarded to one or more of the other of the first and second bonding interfaces and the local ring communication network.

The first and second bonded links include different numbers of constituent links in some embodiments, shown as N, $M_1$, $M_2$ in FIG. 5. The first bonding interface 192 terminates the constituent links of the first bonded link, and constituent links are similarly bonded together by the second bonding interface 196 to form the second bonded link. In the case of the second gateway node 174, for example, the upstream bonding interface 192 terminates $M_1$ constituent links, and $M_2$ links are bonded by the downstream bonding interface 196 to form the bonded link to the next gateway node 184. In other embodiments, the first bonded link and the second bonded link have the same number of constituent connections.

Not all of the links terminated by a gateway node need necessarily be used to construct a local ring and a bonded downstream link. There may be additional incoming bonded, and/or possibly unbonded, links that are unused, such as to provide for future expansion of a local ring, or used for other purposes, such as providing POTS to subscriber premises.

As noted above, the cross-connect module 194 may support CoS, QoS, and possibly other traffic handling functions. FIG. 7 is a block diagram of an example gateway node cross-connect module 210.

The module 210 includes a switch matrix 212, a controller 216, and one or more traffic queues 214. At least the switch matrix 212 and the controller 216 may be implemented in hardware, software, and/or firmware. An FPGA is used in one embodiment. The traffic queue(s) 214 would be provided in the aforementioned FPGA or some sort of memory device, such as a solid-state memory device, although other types of memory devices, including those using fixed, movable, or even removable storage media, may also or instead be used.

With reference to both FIGS. 6 and 7, the switch matrix 212 would be operatively coupled to the bonding interfaces 192, 196 and to the local ring communication network through the ring traffic processor 200. The controller 216 controls the switch matrix 212 to switch received communication traffic between the upstream bonding interface 192, the downstream bonding interface 196, and the local communication ring, to thereby forward the received communication traffic toward its destination in the local ring through the ring traffic processor 200, a remote ring, or the main network.

The set of one or more traffic queues 214, would also be operatively coupled to the bonding interfaces 192, 196 and to the local ring communication network through the ring traffic processor 200, and is for storing the received communication traffic. The traffic queue(s) 214 may include one or more queues for storing received communication traffic when the traffic is received and until it is forwarded. In another embodiment, one or more receive queues are provided to store the traffic when it is received, and one or more separate transmit queues are also provided to store the traffic prior to forwarding. Traffic might be moved from a receive queue to a transmit queue when it is scheduled for transmission, for instance.

Storage of received communication traffic in the traffic queue(s) 214 represents one possible implementation for supporting special traffic handling mechanisms such as QoS. For example, the traffic queue(s) 214 may include respective queues for storing received traffic having different priorities, and those priorities could be serviced differently by the controller 216. Latency-sensitive traffic could be assigned a highest priority and serviced first by the controller 216. The controller 216 might detect queue levels in the traffic queue(s) 214 and switch the highest priority available traffic out of the traffic queue(s) through the switch matrix 212 first, before lower priority traffic is serviced. A similar approach could be applied to traffic associated with different classes of service, or based on some other traffic type delineation. Thus, the controller 216 might determine a priority of received communication traffic and forward the traffic in accordance not only with the forwarding determination, but also in accordance with the determined priority.

The actual QoS, CoS, and/or priority scheme(s) used in embodiments of the invention may vary according to implementation. For example, the cross-connect module 194 and its controller 216 may provide a traffic handling mechanism that is based on Ethernet, RPR, and/or VDSL2, with modifications to support priority-based QoS, depending on the underlying technology and protocol used for inter-ring connections. Other possible mechanisms may be or become apparent to those skilled in the art.

Any of various forwarding mechanisms may also be used. According to a store-and-forward mechanism, the controller 216 may wait until a complete packet or other form of traffic block is stored in the traffic queue(s) 214 before switching that packet or block through the switch matrix 212. In order to reduce delays, however, the controller 216 might instead switch traffic out of the traffic queue(s) 214 once it determines the destination of the traffic, illustratively by examining a packet header, without waiting for a complete traffic block to be received and stored in the traffic queue(s) 214. These considerations affect both latency and depth of memory for the traffic queue(s) 214.

Additional functions may also be provided by a cross-connect module. For example, the switch matrix 212 or possibly another component of a cross-connect module or gateway node might provide a translation function to translate received communication traffic. Where the switch matrix is RPR-based for instance, the translation function might translate received communication traffic between RPR and Ethernet and/or ATM (Asynchronous Transfer Mode) for communications with a DSLAM.

Embodiments of the invention have been described above primarily in terms of systems and apparatus. FIG. 8 is a flow diagram of a method according to an embodiment of the invention.

The method 220 begins at 222, with an operation of terminating a bonded link that includes multiple constituent links. The bonded link enables transmission and reception of communication traffic. At a gateway node, multiple bonded links are provided. Communication traffic is received from a local ring communication network or a bonded link at 228. A determination is then made at 230 as to whether the received communication traffic is to be forwarded to one or more of the local ring communication network and one of first and second bonded links. At 232, the received communication traffic is forwarded in accordance with the determination.

The method 220 represents an illustrative embodiment of the invention. Other embodiments may include further, fewer, or different operations performed in a similar or different order. For instance, the operations 228 through 232 may be repeated as communication traffic is received. Additional operations associated with a QoS mechanism, traffic priorities, and/or traffic translation have not been shown in FIG. 8, but may be provided.

The operations shown in FIG. 8 may also be performed in various ways, at least some of which will be evident from the foregoing description of systems and apparatus. Further variations may be or become apparent to those skilled in the art.

Embodiments of the invention thus provide a communication system that includes gateway nodes serially coupled together through respective bonded links. The system includes at least a first gateway node and a last gateway node. Multiple ring communication networks, each of which includes a respective one of the gateway nodes and at least one subscriber node for providing a communication service to subscriber premises, are also provided. Each of at least the first gateway node and any intermediate gateway nodes between the first gateway node and the last gateway node includes a cross-connect module that receives communication traffic, determines whether the received communication traffic is to be forwarded to one or more of the local ring communication network and a bonded link that is operatively coupled to the gateway node, and forwards the received communication traffic in accordance with the determination.

The cross-connect functionality may be used to provide any of several advantages. For example, with a cross-connect function, multiple links may be bonded together to enable higher bandwidths to be obtained over longer distances than would otherwise be possible in some technologies. In addition, the cross-connect feature allows traffic from downstream rings to be transmitted upstream more quickly by bypassing any intermediate rings. Referring again to FIG. 5 for instance, even if it were possible to service all of the subscriber premises 166/168, 176/178, 186/188 in a single ring, which might not always be the case, latency between the CO 100 and the downstream rings can potentially be reduced significantly by instead providing the multiple interconnected rings 160, 170, 180. Considering traffic to be transferred to the subscriber premises 176 from the CO 100, such traffic can bypass the intermediate ring 160 by being cross-connected through the gateway node 164. Latency could be substantially higher if the subscriber premises 176 were part of a larger ring, since such traffic might then have to pass through more ring nodes before reaching the destination subscriber premises 176.

What has been described is merely illustrative of the application of principles of embodiments of the invention. Other arrangements and methods can be implemented by those skilled in the art without departing from the scope of the present invention.

For example, the invention is no way limited to the specific divisions of function in FIGS. 5 to 7. Although FIG. 5 shows only one gateway node per pedestal, for instance, multiple gateway nodes may physically reside in a single pedestal. It should also be noted that the functions of the switch matrix 212, the traffic queue(s) 214, and the controller 216 in FIG. 7 could potentially be implemented a single physical device.

Additional components may also be provided in some embodiments. In one implementation, a WiFi interface could be provided in each HCC and gateway node. The WiFi interfaces could be used, for example, for technician traffic with the main network, and also as a wireless-based protection mechanism for subscriber premises on any local ring(s). The potential for WiFi interconnected rings as a redundancy feature has been mentioned above. A WiFi link between subscriber premises and a gateway node would also serve as a WiFi-based mesh overlay. A WiFi-based mesh network can thus be used for bonded DSL Rings backhaul, and serve as a redundant connection to twisted pairs or other wired links for added access network resiliency in the case of cable cuts. A femtocell interface could also or instead be used in a substantially similar manner, to support a wireless mesh overlay, or more generally to support wireless communications within and/or with subscriber premises.

Figure 9:
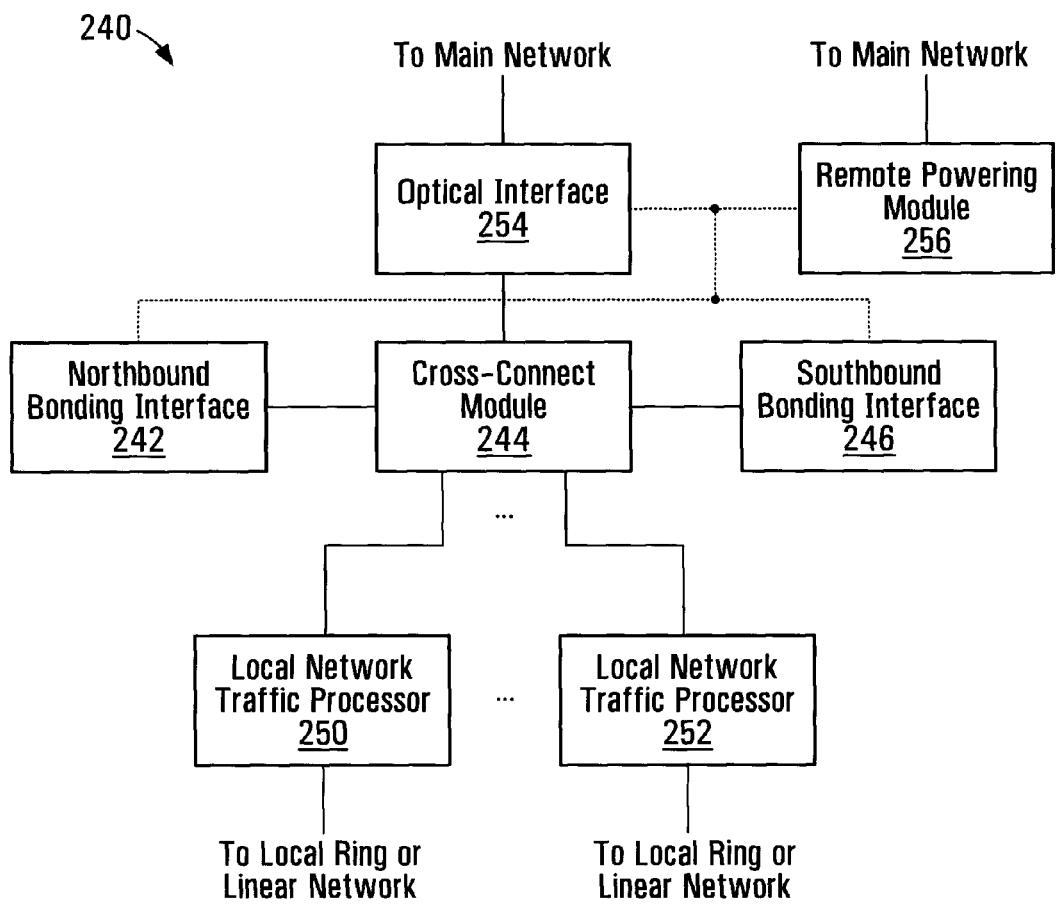
FIG. 9 is a block diagram of another example gateway node.

Further variations are also contemplated, and several of these are illustrated in FIG. 9, which is a block diagram of another example gateway node. The gateway node 240 is substantially similar to the gateway node 190 in FIG. 6, and includes a cross-connect module 244 operatively coupled to a Northbound bonding interface 242 and a Southbound bonding interface 246. The gateway node 240 also includes multiple local network traffic processors, two of which are shown at 250, 252, which are operatively coupled to the cross-connect module 244 and would also be operatively coupled to one or more local network interfaces. The local network interfaces have not been shown in FIG. 9 so as to avoid overly complicating the drawing. An optical interface 254 is operatively coupled to the cross-connect module 244, and a remote powering module 256 is operatively coupled to the cross-connect module and to the interfaces 242, 246, 254 in the example shown.

The bonding interfaces 242, 246, as described above, enable communications over respective bonded links. The cross-connect module 244 may also be implemented substantially as described above, although in the example gateway node 240, the cross-connect module includes additional ports or connections for which a forwarding determination is made.

Each local network traffic processor 250, 252 is part of a local communication network. A local communication network may be a ring network or a linear network, for example. In the case of a ring network, a local network traffic processor 250, 252 may be implemented as a ring traffic processor such as the ring traffic processor 200 shown in FIG. 6. A linear network traffic processor may be substantially similar in structure and operation, although only one local network interface would then be needed. A linear network traffic processor need not support ring switching functions, such as choice of transmission direction or loopback in the event of a failure. In one possible implementation, the same traffic processor is used for ring and linear networks, and configured differently depending on deployment.

In a similar manner, a common structure could be used for the cross-connect modules 194, 244. For example, a cross-connect module might include ports or connectors for all of the components shown in FIG. 9, but not all of those ports or connectors would necessary be "populated" or connected in any specific implementation. There might be only one local network in some embodiments, and other embodiments might include multiple local networks but no optical interface. Thus, a common equipment structure could be deployed and connected and/or configured differently depending on deployment.

The optical interface 254 enables communications with a main communication network over an optical communication link. This interface might be in the form of an RPR-based optical ADM, for instance, where the optical link is part of an optical RPR collector ring. Other types of optical interfaces will be or may become apparent to those skilled in the art.

As noted above with reference to FIG. 6, one of the bonding interfaces 242, 246 may support communications with a main network. The optical interface 254 represents another option for communicating with such a network, and illustratively with an upstream CO.

The remote powering module 256 is also operatively coupled to a remote component, in the main network, through one or more electrically conductive twisted wire pairs, and enables the gateway node 240 to be at least partially powered by that remote component through the twisted wire pair(s). Power connections are illustrated by the dashed lines in FIG. 9. Although the cross-connect module 244 and all of the interfaces 242, 246, 254 are powered by the remote powering module 256 in the example shown, not all components of a gateway node would necessarily be remotely powered.

Any of various power/current levels are possible, and may be implementation dependent. For example, telecom twisted pair current varies in the range of 23-120 mA and allowable operating voltage is between −42V and −60V, often depending on country and equipment provider. At present, most telecom line cards supply 25-45 mA of −46 Vdc to −52 Vdc, which provides a total of 1.15 W-2.34 W of power. Power conversion efficiencies are then applied to arrive at the total available power/pair. These conversion efficiencies are in the range of 80-90% in some embodiments. Twisted pairs could instead be driven at higher voltage and/or current levels to provide higher available power.

The remote powering module 256 might include any of various forms of voltage and/or current converters to transform power on the twisted pairs to the voltage/current levels needed to power components of the gateway node 240. The above-referenced U.S. Patent Application Ser. No. 60/977, 381, for example, discloses powering arrangements that may be suitable for the remote powering module 256.

In the example shown, both the optical interface 254 and the remote powering module 256 are operatively coupled to the main network. This type of deployment would provide the most available pairs for powering the gateway node 240, since no pairs are used for communications with the main network. Where copper pairs are upgraded to an optical medium, the pairs could be left in place and used to power the gateway node 240. Remote powering is still possible when a bonded link over twisted pairs is used to communicate with the main network, although in this case fewer pairs would be available to the remote powering module 256.

FIG. 9 clearly illustrates multiple local networks operatively coupled to the cross-connect module 244. There may also be multiple links to the main network as well. In an example described above, an assumption was made that a binder group was owned by one telco. However, this is not always the case. For the sake of simplicity, assume that the Northbound direction is back to the main network, and that two different binder groups are owned by two different telcos. Two Northbound interfaces 242 could be provided to terminate those binder groups and thereby support two bonded links back to the main network. Respective local networks associated with each binder group or bonded link could then be provided so that each telco can service its customers. Thus, a single gateway node could be used to provide service to customers of two different telcos. In this particular example, the optical interface 254 need not be provided for communications with the main network.

In addition, although described primarily in the context of methods and systems, other implementations of the invention are also contemplated, as instructions stored on a computer-readable medium, for example.

I claim:

1. An apparatus comprising:
a first ring interface to be operatively coupled to subscriber premises on a local ring communication network;
a second ring interface to be operatively coupled to the subscriber premises on the local ring communication network;
a ring traffic processor, operatively coupled to the first and second ring interfaces, operable to transmit and receive communication traffic in the local ring communication network through the first and second ring interfaces;
a first bonding interface that terminates multiple first twisted pairs, bonds the multiple first twisted pairs together to form a first bonded link as a first single logical path, and thereby enables communications over the first bonded link using first frequency bands that are available on the multiple first twisted pairs;
a second bonding interface that terminates multiple second twisted pairs, bonds the multiple second twisted pairs together to form a second bonded link as a second single logical path, and thereby enables communications over the second bonded link using second frequency bands that are available on the multiple second twisted pairs; and
a cross-connect module operatively coupled to the first bonding interface, to the second bonding interface, and to the ring traffic processor, the cross-connect module being operable to receive communication traffic, to determine whether the received communication traffic is to be forwarded to one or more of the ring traffic processor, the first bonding interface, and the second bonding interface, and to forward the received communication traffic in accordance with the determination.

2. The apparatus of claim 1, wherein the cross-connect module is operable to determine, where the received communication traffic comprises communication traffic from the local ring communication network through the ring traffic processor, whether the received communication traffic is to be forwarded to one or more of the first bonding interface and the second bonding interface.

3. The apparatus of claim 1, wherein the cross-connect module is operable to determine, where the received communication traffic comprises communication traffic received through one of the first and second bonding interfaces, whether the received communication traffic is to be forwarded to one or more of the other of the first and second bonding interfaces and the ring traffic processor.

4. The apparatus of claim 1, wherein the first and second bonded links comprise different numbers of twisted pairs.

5. The apparatus claim 1, wherein the first and second bonded links comprise the same number of twisted pairs.

6. The apparatus of claim 1, wherein the first and second bonded links operatively couple the apparatus to respective first and second remote communication networks.

7. The apparatus of claim 1, wherein the cross-connect module comprises:
a switch matrix operatively coupled to the first and second bonding interfaces and to the ring traffic processor; and
a controller, operatively coupled to the switch matrix, that controls the switch matrix to switch the received communication traffic between the first bonding interface, the second bonding interface, and the ring traffic processor, to thereby forward the received communication traffic in accordance with the determination.

8. The apparatus of claim 7, further comprising:
a set of one or more traffic queues for storing the received communication traffic, the set of traffic queues being operatively coupled to the first and second bonding interfaces, to the local ring communication network, and to the switch matrix,
the controller being further operative to provide QoS (Quality of Service) forwarding for the received communication traffic.

9. The apparatus of claim 8, wherein the set of one or more traffic queues comprises receive queues for storing the received communication when received, and transmit queues for storing the received communication traffic prior to forwarding.

10. The apparatus of claim 8, wherein the received communication traffic is forwarded from the set of one or more queues.

11. The apparatus of claim 8, wherein the controller provides the QoS forwarding by determining a priority of the received communication traffic and forwarding the received communication traffic further in accordance with the determined priority.

12. The apparatus of claim 8, wherein the QoS forwarding is implemented using a traffic handling mechanism based on one or more of: RPR (Resilient Packet Ring), Ethernet, DSL (Digital Subscriber Line), and an iteration of DSL.

13. The apparatus of claim 1, wherein the first and second bonded links comprise DSL (Digital Subscriber Line) links, and wherein the local ring communication network comprises nodes, including the subscriber premises, operatively coupled together through DSL links.

14. The apparatus of claim 1, wherein the cross-connect module is further operable to provide a translation function to translate the received communication traffic.

15. The apparatus of claim 14, wherein the translation function comprises a function to translate the received communication traffic between a traffic handling mechanism based on RPR (Resilient Packet Ring) and Ethernet or ATM (Asynchronous Transfer Mode).

16. The apparatus of claim 1, wherein the local ring communication network comprises one of a plurality of local communication networks operatively coupled to the cross-connect module, the cross-connect module being operable to determine whether the received communication traffic is to be forwarded to one or more of the local communication networks, the first bonding interface, and the second bonding interface, and to forward the received communication traffic in accordance with the determination.

17. The apparatus of claim 1, further comprising:
a third bonding interface, operatively coupled to the cross-connect module, that terminates multiple third twisted pairs, bonds the multiple third twisted pairs together to form a third bonded link as a third single logical path, and thereby enables communications over the third bonded link using third frequency bands that are available on the multiple third twisted pairs, the cross-connect module being operable to determine whether the received communication traffic is to be forwarded to one or more of the ring traffic processor, the first bonding interface, the second bonding interface, and the third bonding interface, and to forward the received communication traffic in accordance with the determination,
wherein two of the first, second, and third bonded links comprise respective communication links to a main communication network.

18. The apparatus of claim 17,
wherein the local ring communication network comprises one of a plurality of local communication networks operatively coupled to the cross-connect module, the cross-connect module being operable to determine whether the received communication traffic is to be forwarded to one or more of the local communication networks, the first bonding interface, the second bonding interface, and the third bonding interface, and to forward the received communication traffic in accordance with the determination, and
wherein the plurality of local communication networks comprises a respective local communication network associated with each of the communication links to the main communication network.

19. The apparatus of claim 1, wherein one of the first and second bonded links comprises a communication link to a main communication network.

20. The apparatus of claim 1, further comprising:
an optical interface, operatively coupled to the cross-connect module, that enables communications with a main communication network over an optical communication link.

21. The apparatus of claim 20, further comprising:
a remote powering module operatively coupled to a component of the main communication network through one or more electrically conductive twisted wire pairs, the remote powering module enabling the apparatus to be at least partially powered by the component of the main communication network through the one or more twisted wire pairs.

22. The apparatus of claim 1, further comprising:
a remote powering module operatively coupled to a remote component through one or more electrically conductive twisted wire pairs, the remote powering module enabling the apparatus to be at least partially powered by the remote component through the one or more twisted wire pairs.

23. The apparatus of claim 1, further comprising:
a wireless interface, operatively coupled to the cross-connect module, that enables the apparatus to communicate over a wireless communication link.

24. The apparatus of claim 23, wherein the wireless interface comprises one or more of: a WiFi interface and a femtocell interface.

25. The apparatus of claim 1, wherein the local ring communication network comprises a first subscriber premises operatively coupled to the first ring interface, a last subscriber premises operatively coupled to the second ring interface, and intermediate subscriber premises operatively coupled between the first subscriber premises and the last subscriber premises, wherein communication traffic transfer between the intermediate subscriber premises and the ring traffic processor is through one or both of the first subscriber premises and the last subscriber premises.

26. The apparatus of claim 1, wherein the ring traffic processor is further operable to determine a direction in which communication traffic is to be transmitted in the local ring communication network, through the first ring interface or through the second ring interface.

27. A method comprising:
receiving communication traffic from a local ring communication network through a first ring interface that is operatively coupled to subscriber premises on the local ring communication network or a second ring interface that is operatively coupled to the subscriber premises on the local ring communication network, or from one of first and second bonded links through a first bonding interface that terminates, multiple first twisted pairs and bonds the multiple first twisted pairs together to form the first bonded link as a first single logical path to enable communications over the first bonded link using first frequency bands that are available on the multiple first twisted pairs or through a second bonding interface that terminates multiple second twisted pairs and bonds the multiple second twisted pairs together to form the second bonded link as a second single logical path to enable communications over the second bonded link using second frequency bands that are available on the multiple second twisted pairs;
determining, by a cross-connect module that is operatively coupled to the first bonding interface, to the second bonding interface, and to a ring traffic processor that is coupled to the first ring interface and the second ring interface and operable to transmit and receive communication traffic in the local ring communication network through the first and second ring interfaces, whether the received communication traffic is to be forwarded to one or more of the ring traffic processor, the first bonding interface, and the second bonding interface; and
forwarding, by the cross-connect module, the received communication traffic in accordance with the determination.

28. The method of claim 27, wherein, where the received communication traffic comprises communication traffic from the local ring communication network, the determining comprises determining whether the received communication traffic is to be forwarded to one or more of the first bonding interface and the second bonding interface.

29. The method of claim 27, wherein, where the received communication traffic comprises communication traffic received through one of the first and second bonding interfaces, the determining comprises determining whether the received communication traffic is to be forwarded to one or more of the other of the first and second bonding interfaces and the ring traffic processor.

30. The method of claim 27, wherein the first and second bonded links comprise different numbers of twisted pairs.

31. The method of claim 27, wherein the first and second bonded links comprise the same number of twisted pairs.

32. The method of claim 27, wherein the first and second bonded links enable communications with respective first and second remote communication networks.

33. The method of claim 27, wherein the forwarding comprises forwarding further in accordance with a QoS (Quality of Service) mechanism.

34. The method of claim 33, wherein the QoS mechanism involves determining a priority of the received communication traffic, and wherein the forwarding comprises forwarding the received communication traffic further in accordance with the determined priority.

35. The method of claim 33, wherein the QoS mechanism is implemented using a traffic handling mechanism based on one or more of: RPR (Resilient Packet Ring), Ethernet DSL (Digital Subscriber Line), and an iteration of DSL.

36. The method of claim 27, wherein the first and second bonded links comprise DSL (Digital Subscriber Line) links, and wherein the local ring communication network comprises nodes, including the subscriber premises, operatively coupled together through DSL links.

37. The method of claim 27, further comprising translating the received communication traffic.

38. The method of claim 37, wherein the translating comprises translating the received communication traffic between a traffic handling mechanism based on RPR (Resilient Packet Ring) and Ethernet or ATM (Asynchronous Transfer Mode).

39. The method of claim 27,
wherein the local ring communication network comprises one of a plurality of local communication networks,
wherein the receiving comprises receiving communication traffic from one of the local communication networks or one of the first and second bonding interfaces, and
wherein the determining comprises determining whether the received communication traffic is to be forwarded to one or more of the local communication networks, the first bonding interface, and the second bonding interface.

40. The method of claim 27,
wherein the receiving further comprises receiving communication traffic from a third bonded link through a third bonding interface that terminates, multiple third twisted pairs and bonds the multiple third twisted pairs together to form the third bonded link as a third single logical path to enable communications over the third bonded link using third frequency bands that are available on the multiple third twisted pairs,
wherein the determining comprises determining whether the received communication traffic is to be forwarded to one or more of the ring traffic processor, the first bonding interface, the second bonding interface, and the third bonding interface, and
wherein two of the first, second, and third bonded links comprise respective communication links to a main communication network.

41. The method of claim 40,
wherein the local ring communication network comprises one of a plurality of local communication networks,
wherein the determining comprises determining whether the received communication traffic is to be forwarded to one or more of the local communication networks, the first bonding interface, the second bonding interface, and the third bonding interface, and wherein the plurality of local communication networks comprises a respective local communication network associated with each of the communication links to the main communication network.

42. The method of claim 27, wherein one of the first and second bonded links comprises a communication link to a main communication network.

43. A non-transitory computer-readable medium storing instructions which when executed perform a method comprising:
- receiving communication traffic from a local ring communication network through a first ring interface that is operatively coupled to subscriber premises on the local ring communication network or a second ring interface that is operatively coupled to the subscriber premises on the local ring communication network, or from one of first and second bonded links through a first bonding interface that terminates, multiple first twisted pairs and bonds the multiple first twisted pairs together to form the first bonded link as a first single logical path to enable communications over the first bonded link using first frequency bands that are available on the multiple first twisted pairs or through a second bonding interface that terminates multiple second twisted pairs and bonds the multiple second twisted pairs together to form the second bonded link as a second single logical path to enable communications over the second bonded link using second frequency bands that are available on the multiple second twisted pairs;
- determining whether the received communication traffic is to be forwarded to one or more of, the first bonding interface, and the second bonding interface, and a ring traffic processor that is coupled to the first ring interface and the second ring interface and operable to transmit and receive communication traffic in the local ring communication network through the first and second ring interfaces; and
- forwarding the received communication traffic in accordance with the determination.

44. A communication system comprising:
- a plurality of gateway nodes serially coupled together through respective bonded links, the plurality of gateway nodes comprising at least a first gateway node and a last gateway node;
- a plurality of local communication networks, each of the local communication networks comprising a respective one of the gateway nodes and at least one subscriber node for providing a communication service to subscriber premises,
- each of at least the first gateway node and any intermediate gateway nodes between the first gateway node and the last gateway node comprising a cross-connect module that receives communication traffic; determines whether the received communication traffic is to be forwarded to one or more of the local communication network and a bonded link that is operatively coupled to the gateway node, the bonded link comprising multiple twisted pairs that are bonded together to form the bonded link as a single logical path to enable communications over the bonded link using frequency bands that are available on the multiple twisted pairs; and forwards the received communication traffic in accordance with the determination,
- at least one of the local communication networks comprising a ring communication network that comprises a respective one of the gateway nodes and a subscriber node,
- at least the respective one of the gateway nodes in the ring communication network further comprising:
  - a first ring interface operatively coupled to the subscriber node,
  - a second ring interface operatively coupled to the subscriber node; and
  - a ring traffic processor, operatively coupled to the first and second ring interfaces and to the a cross-connect module, operable to transmit and receive communication traffic in the ring communication network through the first and second ring interfaces.

* * * * *